(12) United States Patent  
Kikuchi

(10) Patent No.: US 10,084,875 B2  
(45) Date of Patent: Sep. 25, 2018

(54) METHOD OF TRANSFERRING DATA, DATA TRANSFER DEVICE AND NON-TRANSITORY COMPUTER-READABLE STORAGE MEDIUM

(71) Applicant: FUJITSU LIMITED, Kawasaki-shi, Kanagawa (JP)

(72) Inventor: Shunsuke Kikuchi, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 138 days.

(21) Appl. No.: 15/380,173

(22) Filed: Dec. 15, 2016

(65) Prior Publication Data

US 2017/0264704 A1    Sep. 14, 2017

(30) Foreign Application Priority Data

Mar. 11, 2016 (JP) ................. 2016-047831

(51) Int. Cl.
*G06F 15/16* (2006.01)
*H04L 29/08* (2006.01)

(52) U.S. Cl.
CPC .......... *H04L 67/2842* (2013.01); *H04L 67/06* (2013.01)

(58) Field of Classification Search
CPC ............................ H04L 67/06; H04L 67/2842
See application file for complete search history.

(56) References Cited

U.S. PATENT DOCUMENTS

| | | | | |
|---|---|---|---|---|
| 7,912,812 B2* | 3/2011 | Ramos | ................ | G06F 17/3048 707/609 |
| 2006/0198299 A1* | 9/2006 | Brzezinski | ............. | H04L 47/10 370/229 |
| 2007/0213998 A1* | 9/2007 | Butler | ................. | G06Q 10/063 705/1.1 |
| 2012/0209941 A1* | 8/2012 | Yamamoto | ............. | H04L 41/14 709/212 |
| 2013/0208592 A1* | 8/2013 | Lu | .......................... | H04L 47/10 370/231 |
| 2014/0032741 A1* | 1/2014 | Lau | ..................... | H04L 67/1095 709/224 |
| 2014/0143315 A1 | 5/2014 | Kawazoe et al. | | |
| 2018/0131749 A1* | 5/2018 | Dobrenko | .............. | H04L 67/06 |

FOREIGN PATENT DOCUMENTS

| | | |
|---|---|---|
| JP | 2006-203537 | 8/2006 |
| JP | 2014-103553 | 6/2014 |
| JP | 2015-524586 | 8/2015 |
| WO | WO 2014/004720 A1 | 1/2014 |

OTHER PUBLICATIONS

Apache Kafka 0.10.1, "4.4 The Producer" p. 38 (2 pages).

* cited by examiner

*Primary Examiner* — Mohamed A Wasel
(74) *Attorney, Agent, or Firm* — Staaas & Halsey LLP

(57) ABSTRACT

A method of transferring data executed by a data transfer device, the method includes receiving a plurality of first data and a plurality of second data, accumulating the received plurality of first data and the received plurality of second data respectively, sending, to a first node, the plurality of first data accumulated during a first period, and sending, to a second node, the plurality of second data accumulated during a second period, wherein, the first period is longer than the second period when a first data amount of the plurality of first data to be sent to the first node per unit time is greater than a second data amount of the plurality of second data to be sent to the second node per the unit time.

15 Claims, 24 Drawing Sheets

FIG. 9

| BEACON ID | TIME INFORMATION | GATEWAY ID |
|---|---|---|
| beC | 14:59:53 | 6 |
| | 14:59:54 | 6 |
| | 14:59:55 | 6 |
| | 14:59:56 | 6 |
| | : | : |
| : | : | : |

FIG. 12

| TRANSFER DESTINATION | ADDRESS |
|---|---|
| +1 NODE | a.a.a.a |
| +2 NODE | b.b.b.b |
| +4 NODE | c.c.c.c |
| +8 NODE | d.d.d.d |

| TRANSFER DESTINATION | HOLDING DATA |
|---|---|
| +1 NODE | (15,data(0,beA,14;59:56))<br>(15,data(0,beA,14;59:59)) |
| +2 NODE | (1,data(6,beD,14;59:58)) |
| +4 NODE | ... |
| +8 NODE | ... |

| TRANSFER DESTINATION | HOLDING TIME (SECOND) |
|---|---|
| +1 NODE | 4 |
| +2 NODE | 2 |
| +4 NODE | 1 |
| +8 NODE | 1/2 |

| TRANSFER DESTINATION | REMAINING HOLDING DATA (SECOND) |
|---|---|
| +1 NODE | 0 |
| +2 NODE | 1.5 |
| +4 NODE | 0.5 |
| +8 NODE | – |

132

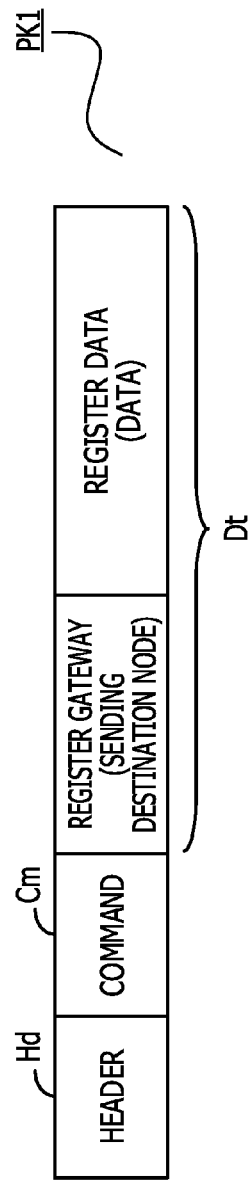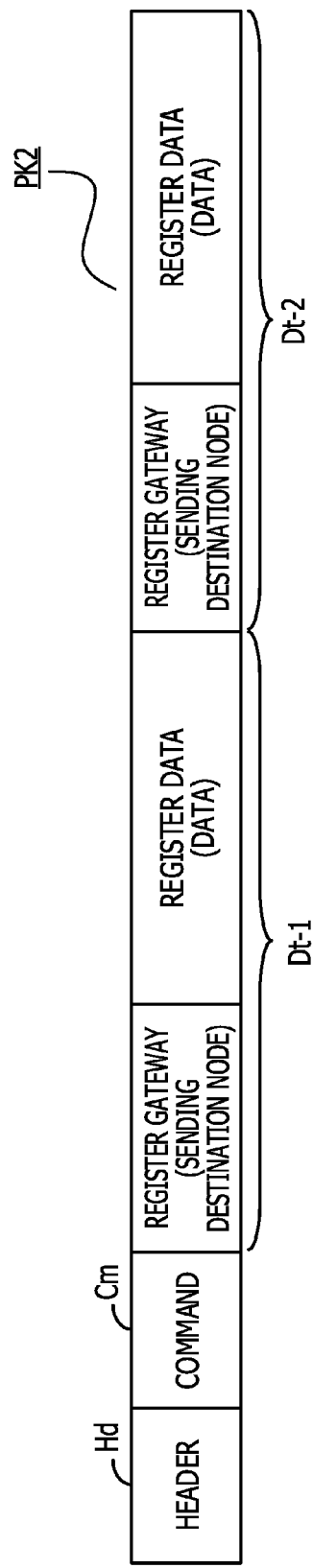

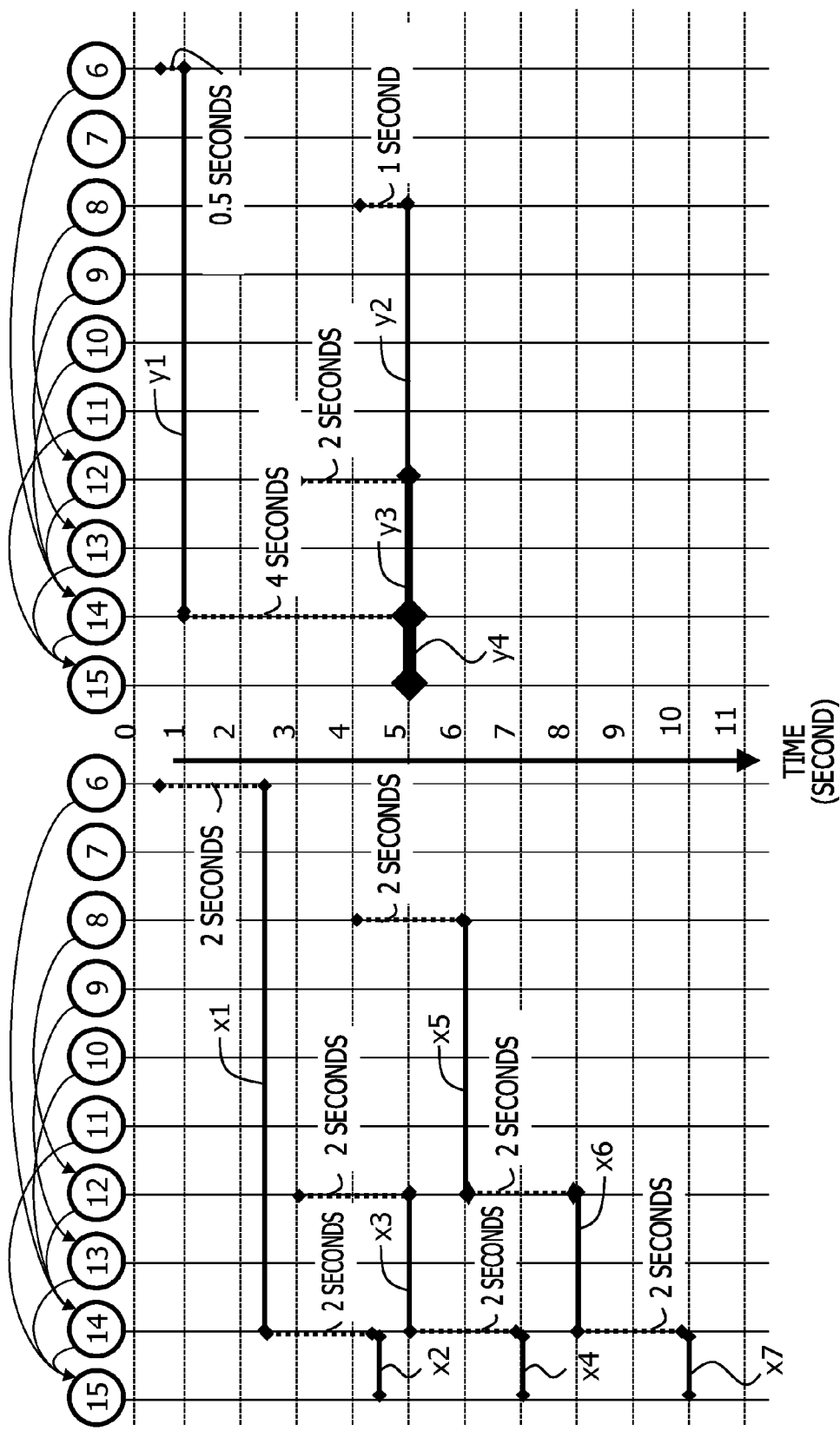

METHOD OF TRANSFERRING DATA, DATA TRANSFER DEVICE AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-047831, filed on Mar. 11, 2016, the entire contents of which are incorporated herein by reference.

FIELD

The embodiments discussed herein are related to a method of transferring data, a data transfer device and a non-transitory computer-readable storage medium.

BACKGROUND

Lately, an information processing system based on peer-to-peer (P2P) has been used. In P2P information processing system, each peer (node) stores information and also registers information in another node or requests another node to register information. In this information processing system, a certain node receives and stores information (hereinafter called "data") output from a mobile device, for example. Then, in response to a query concerning a certain item of data from a center server, a node storing this item of data sends it to the center server.

In this information processing system, items of data concerning plural devices are distributed over plural nodes and are stored in them, based on the distributed hash table (DHT) method. According to the DHT method, a node that stores an item of data (hereinafter called "register node") is determined based on a hash function, for example.

A node that receives data from a device sends the data to a register node directly or via at least one node. A relay node transfers the received data to the register node, and the register node stores the received data. If data register processing is performed highly frequently, data transfer processing is also performed highly frequently, thereby increasing a network load.

Accumulating items of data for a predetermined period of time before transferring data and then sending the accumulated items of data together at one time has been proposed. Such integrated data sending reduces the network load. Technologies concerning the network efficiency are discussed in, for example, Japanese National Publication of International Patent Application No. 2015-524586, Japanese Laid-open Patent Publication Nos. 2014-103553 and 2006-203537, and Apache Kafka, 4.4 The Producer.

SUMMARY

According to an aspect of the invention, a method of transferring data executed by a data transfer device, the method includes receiving a plurality of first data and a plurality of second data, determining that the received plurality of first data are to be sent to a first node as a transfer destination node, and that the received plurality of second data are to be sent to a second node as the transfer destination node, accumulating the received plurality of first data and the received plurality of second data respectively, sending, to the first node determined in the determining, the plurality of first data accumulated during a first period, and sending, to the second node determined in the determining, the plurality of second data accumulated during a second period, wherein, the first period is longer than the second period when a first data amount of the plurality of first data to be sent to the first node per unit time is greater than a second data amount of the plurality of second data to be sent to the second node per the unit time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates an example of a data holding database 140 (FIGS. 6 and 7) discussed with reference to the flowchart of FIG. 8;

FIG. 12 illustrates an example of a transfer destination table 131 (FIGS. 6 and 7) based on Chord;

FIG. 14 illustrates an example of a data temporary holding database 134 (FIGS. 6 and 7) discussed in steps S25 through S27 of the flowchart in FIG. 10;

FIG. 15 illustrates an example of a holding time table 132 (FIGS. 6 and 7) discussed in step S28 of the flowchart in FIG. 10;

FIG. 20 illustrates an example of a holding time management table 133 discussed in step S29 of the flowchart in FIG. 10;

FIGS. 22A and 22B illustrate examples of packets generated by the data transfer program 120 in this embodiment;

FIGS. 24A and 24B illustrate an example of data integration executed by the data transfer program 120 in this embodiment.

DESCRIPTION OF EMBODIMENTS

The transfer destination to which data is transferred is different according to the sending destination node (register node). The frequency with which transfer processing is executed is different according to the transfer destination. Thus, the number of items of data to be transferred per unit time is different according to the transfer destination.

If plural items of data are accumulated for the same period of time and the accumulated items of data are sent together at one time regardless of the transfer destination, for a transfer destination to which few items of data are transferred, data is accumulated for the same period of time as the other destinations in spite of a low data integration degree for this transfer destination. This decreases the efficiency in integrating data and also increases the time taken to execute data sending processing.

An embodiment of the present disclosure will be described below with reference to the accompanying drawings. The technical scope of the disclosure is not restricted to this embodiment, but is defined by the following claims and their equivalents.

[Information Processing System]

Figure 1:
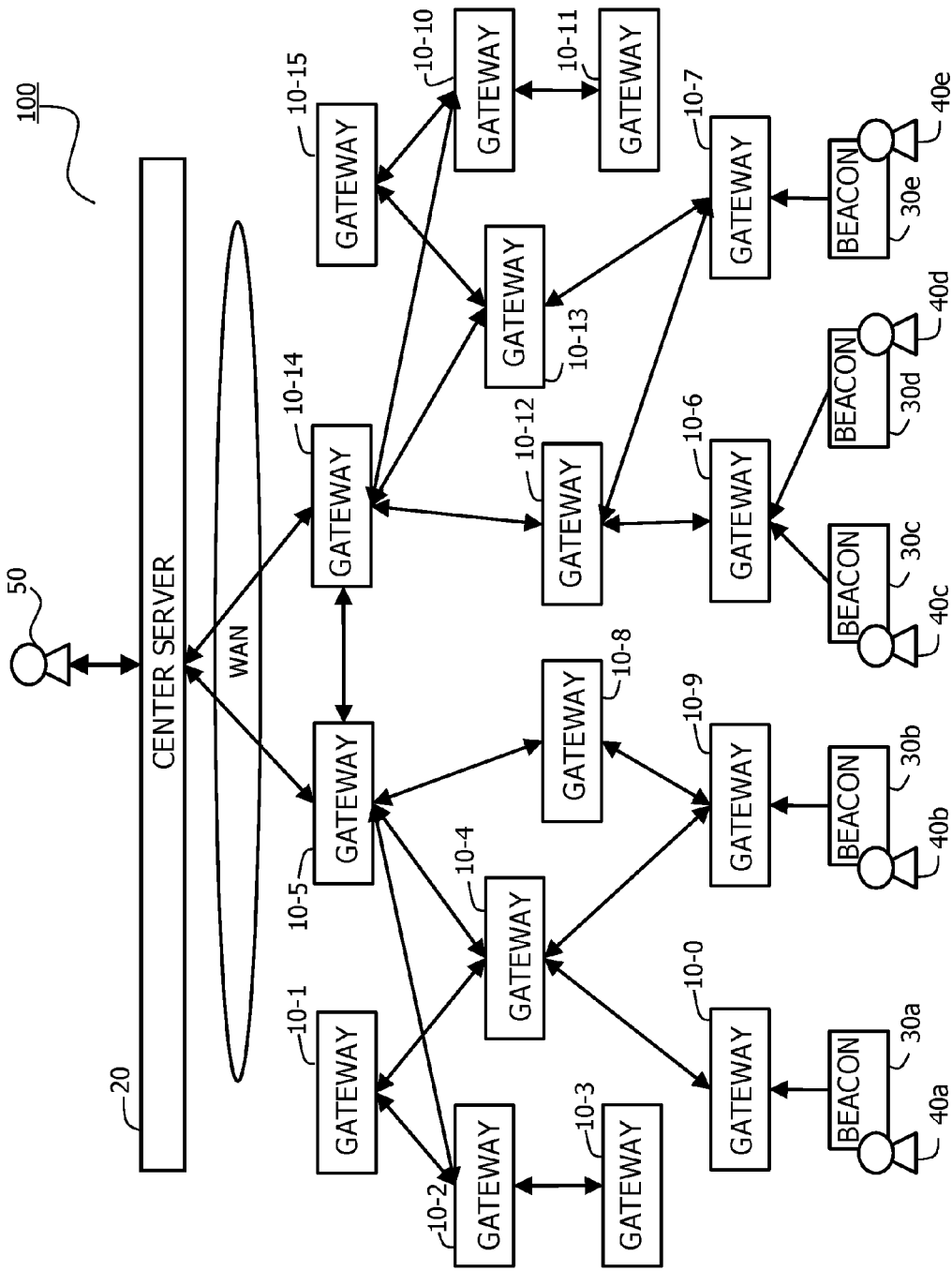
FIG. 1 illustrates an example of an information processing system 100 according to an embodiment.

FIG. 1 illustrates an example of an information processing system 100 according to the embodiment. The information processing system 100 is a system based on peer-to-peer (P2P). In the P2P information processing system 100, each peer stores data. In the information processing system 100 illustrated in FIG. 1, peers correspond to gateways 10-0 through 10-15.

The information processing system 100 includes a center server 20, plural gateways 10-0 through 10-15 (also called "gateway 10" or "gateways 10"), and plural beacons 30a through 30e (also called "beacon 30" or "beacons 30"). Although only sixteen gateways 10 and five beacons 30 are illustrated in FIG. 1, the information processing system 100 includes several tens of thousands of gateways 10 and beacons 30.

The beacon 30 is a mobile device that transmits, for example, a radio wave or electromagnetic wave signal. Each beacon 30 illustrated in FIG. 1 regularly sends data to a gateway 10 with which the beacon 30 is able to communicate via near field communication. Near field communication is wireless communication covering a narrow communication area and is based on Bluetooth (registered trademark), for example. The beacons 30 illustrated in FIG. 1 are movable.

A gateway 10 receives data sent from a beacon 30. A gateway 10 is coupled to another gateway 10 by wireless communication or via a wired communication path. Some gateways 10 are coupled to the center server 20 via a wide area network (WAN). The gateway 10 may be a mobile device or may be installed at a fixed position. The gateway 10 is, for example, a mobile terminal device such as a smartphone, an access point, or a device installed in a store or a facility.

The information processing system 100 illustrated in FIG. 1 is, for example, a location detecting system for children. In this location detecting system, children 40a through 40e (also called "child 40" or "children 40") each carries a beacon 30. The beacon 30 regularly transmits data concerning beacon identification (ID) for identifying the beacon 30 to a gateway 10 with which the beacon 30 is able to communicate.

The gateway 10 that receives data transmitted from a beacon 30 sends the data to a predetermined gateway 10 and causes it to store the data (register processing). The center server 20 responds to a query regarding a child 40 from a parent 50 (user) and searches for data concerning the beacon 30 carried by the child 40 (search processing). Details of register processing and search processing will be discussed later with reference to FIG. 2.

The information processing system 100 illustrated in FIG. 1 is not restricted to an example of the location detecting system for children, and may be a system that manages data obtained by sensors or data to be subjected to information processing, for example.

[Data Register Processing and Search Processing]

Figure 2:
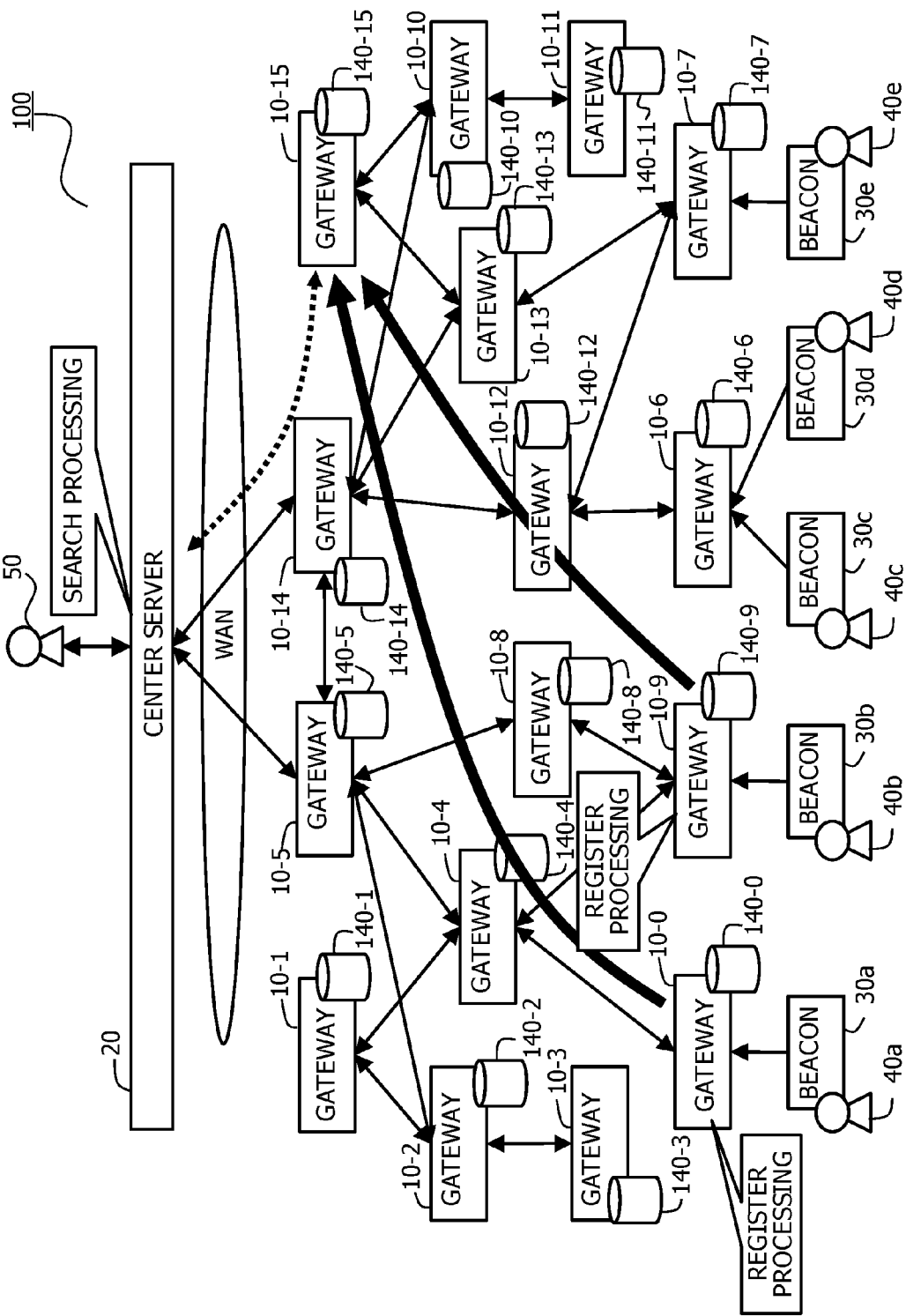
FIG. 2 illustrates data register processing and data search processing in the information processing system 100 illustrated in FIG. 1.

FIG. 2 illustrates data register processing and data search processing in the information processing system 100 illustrated in FIG. 1. In FIG. 2, the same elements as those illustrated in FIG. 1 are designated by like reference numerals.

(Distributed Hash Table (DHT))

In the information processing system 100 illustrated in FIGS. 1 and 2, items of data concerning the plural beacons 30 are distributed over the plural gateways 10 and are stored in them, based on the DHT method. The plural gateways 10 store a hash table in which key information (corresponding to beacon IDs) and values (corresponding to items of data) are associated with each other in a distributed manner. The gateways 10-0 through 10-15 respectively have data holding databases 140-0 through 140-15 (also called "data holding database 140") in which items of data concerning the beacons 30 are stored.

According to the DHT method, data concerning a certain beacon 30 is stored in a predetermined gateway 10 corresponding to this beacon 30 (hereinafter called "register gateway 10"). For example, the register gateway 10 of a certain beacon 30 is determined based on a hash value calculated by inputting the beacon ID of this beacon 30 into a hash function.

(Register Processing)

FIG. 2 illustrates an example in which data transmitted from the beacon 30b is received by the gateway 10-9 and is registered in a register gateway 10. Upon receiving data, the gateway 10-9 adds gateway identification (ID) for identifying the gateway 10-9 to the data. The gateway 10-9 also calculates a hash value by inputting the beacon ID "beB" of the beacon 30b into the hash function. Then, the gateway specifies the gateway 10-15 as the register gateway 10 for the beacon 30b, based on the hash value.

The gateway 10-9 then sends the data appended with the gateway ID for identifying the gateway 10-9 to the gateway 10-15. The gateway 10-9 sends the data to the gateway 10-15 via one or plural gateways 10. Upon receiving the data, the gateway 10-15 stores the data in the data holding database 140-15.

An example in which data transmitted from the beacon 30a is received by the gateway 10-0 and is registered in a register gateway 10 will now be discussed. The gateway 10-0 adds a gateway ID for identifying the gateway 10-0 to the data received from the beacon 30a. In a manner similar to the gateway 10-9, the gateway 10-0 then specifies the gateway 10-15 as the register gateway 10 for the beacon 30a, based on the beacon ID "beA". The gateway 10-0 sends the data appended with the gateway ID for identifying the gateway 10-0 to the gateway 10-15. The gateway 10-15 stores the data in the data holding database 140-15.

In the example illustrated in FIG. 2, the register gateway 10 for the beacon 30a and that for the beacon 30b are the same gateway 10-15. However, the register gateways 10 for all the beacons 30a through 30e are not necessarily the same gateway 10. As discussed above, the register gateway 10 for each beacon 30 is determined based on the hash value calculated by inputting the beacon ID into the hash function.

The beacons 30 illustrated in FIGS. 1 and 2 are movable. For example, if the beacon 30a moves from a neighborhood of the gateway 10-0 to a neighborhood of the gateway 10-7, the gateway 10-7 receives data from the beacon 30a. Then, the gateway 10-7 similarly specifies the gateway 10-15 as the register gateway 10 and sends the data to the gateway 10-15. The beacon ID of the beacon 30a is identical, and thus, the register gateway 10 for the beacon 30a is the gateway 10-15.

(Search Processing)

An example in which the center server 20 detects the location of the child 40b carrying the beacon 30b will be discussed below. The center server 20 calculates the hash value by inputting the beacon ID "beB" of the search object into the hash function, and then specifies the register gateway 10 (gateway 10-15) for the beacon 30b. The center server 20 then outputs an instruction to search for data concerning the beacon ID "beB" to the gateway 10-15 (indicated by the dotted line in FIG. 2).

In response to this search instruction, the gateway 10-15 obtains data concerning the beacon ID "beB" from the data holding database 140-15 and sends the obtained data to the center server 20 (indicated by the dotted line in FIG. 2). Based on the gateway ID indicated by the received data, the center server 20 identifies the gateway 10 located near the beacon 30b (gateway 10-9 in the example in FIG. 2) and recognizes the position of the identified gateway 10, thereby detecting the position of the child 40b.

In this manner, in the information processing system 100 illustrated in FIGS. 1 and 2, data concerning a certain beacon 30 is stored in a register gateway 10 specified based on the beacon ID of this beacon 30. Hence, when performing search processing, the center server 20 does not have to search for the data concerning the target beacon 30 from all the gateways 10. This reduces the network load in performing search processing.

If a gateway 10 that receives data transmitted from a beacon 30 is not the register gateway 10 for this beacon 30, data sending processing from the received gateway 10 to the register gateway 10 is performed. Data sending processing will be discussed below with reference to FIG. 3.

[Data Sending Processing]

Figure 3:
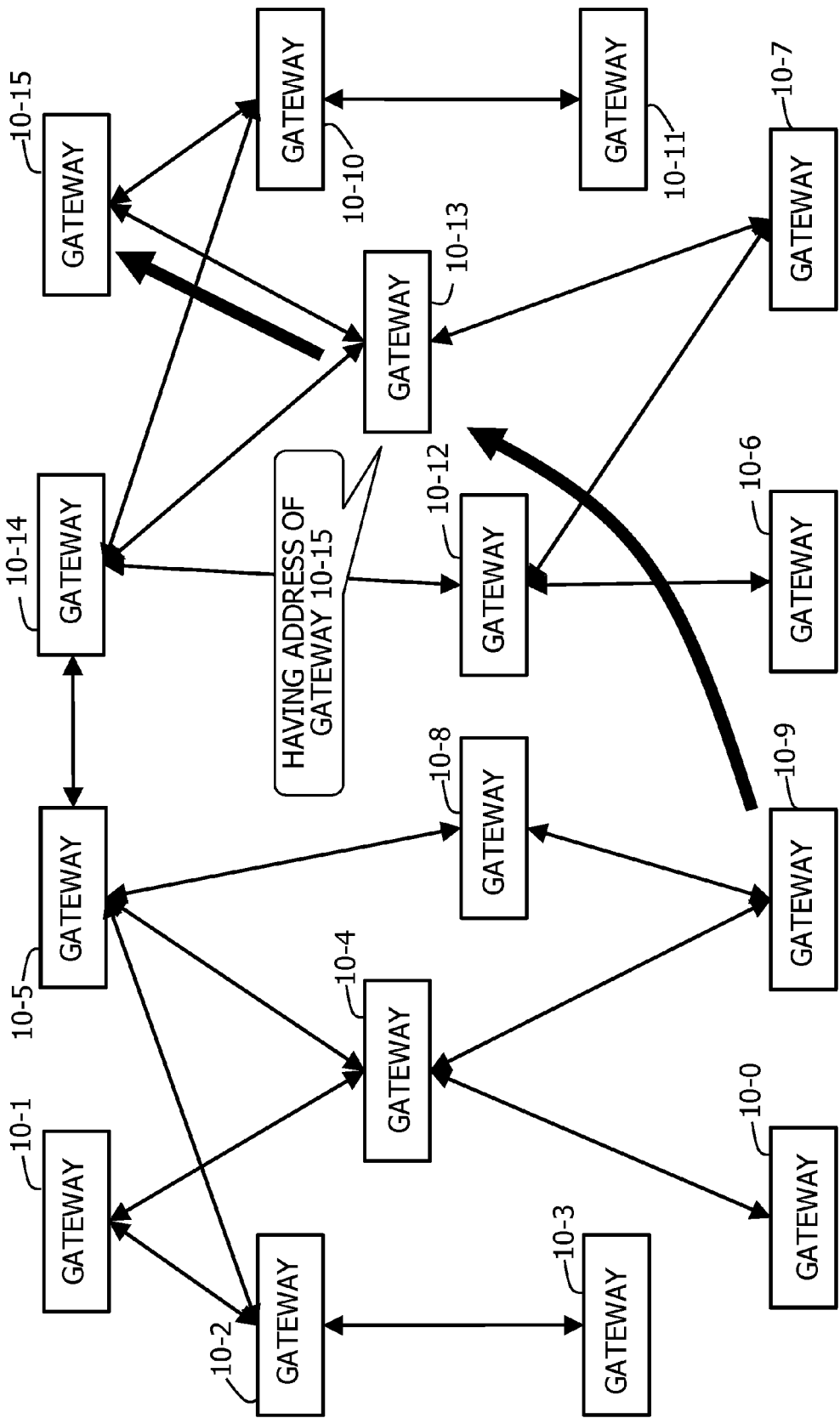
FIG. 3 illustrates data sending processing according to a distributed hash table (DHT) method.

FIG. 3 illustrates data sending processing according to the DHT method. FIG. 3 illustrates the gateways 10-0 through 10-15 extracted from FIGS. 1 and 2. In FIG. 3, the same elements as those illustrated in FIGS. 1 and 2 are designated by like reference numerals.

As discussed above, the information processing system 100 includes, for example, several tens of thousands of gateways 10. If each gateway 10 stores Internet protocol (IP) addresses of all the gateways 10, the space taken up in the memory and the management cost are increased. Instead, each gateway 10 has IP addresses of only some gateways 10.

If a gateway 10 that has received data from a beacon 30 does not have the IP address of a register gateway 10, it determines a transfer destination gateway 10 based on a predetermined algorithm and transfers the data to the transfer destination gateway 10. Then, upon receiving this data, the transfer destination gateway 10 further transfers the data to another gateway 10. By repeating this transfer operation, the data reaches the register gateway 10.

FIG. 3 illustrates a sending path from the gateway 10-9 to the gateway 10-15 illustrated in FIG. 2. In the example in FIG. 3, the gateway 10-9 does not have the IP address of the gateway 10-15, while the gateway 10-13 has the IP address of the gateway 10-15.

The gateway 10-9 determines, for example, the gateway 10-13, as a transfer destination, based on the above-described predetermined algorithm, and then transfers the data to the gateway 10-13. As described above, the gateway 10-13 has the IP address of the gateway 10-15 and thus transfers the data to the gateway 10-15. As a result, the data reaches the gateway 10-15.

In the example in FIG. 3, the sending path from the gateway 10-9 to the gateway 10-15 is "gateway 10-9→gateway 10-13→gateway 10-15". This sending path includes two transfer paths "gateway 10-9→gateway 10-13" and "gateway 10-13→gateway 10-15".

Transfer of data from the gateway 10-9 to the gateway 10-13 is performed based on the actual physical network. In the example in FIG. 3, this transfer operation is implemented by sending data based on a path "gateway 10-9→gateway 10-8→gateway 10-5→gateway 10-14→gateway 10-13", for example. Transfer of data from the gateway 10-13 to the gateway 10-15 is performed similarly.

The information processing system 100 includes, for example, several tens of thousands of beacons 30. Each beacon 30 regularly transmits data. Consequently, data register processing is performed highly frequently, and accompanying data transfer processing is also performed highly frequently, thereby increasing a network load.

A technology of sending plural items of data accumulated for a predetermined period of time together at one time has been proposed. According to this technology, when transferring data, each gateway 10 sends items of data accumulated for the predetermined period of time together to a transfer destination gateway 10. Integrating of plural items of data in this manner reduces the number of packets and thus reduces the network load.

Data sending paths vary according to the combination of a sending source gateway 10 and a sending destination gateway 10 (register gateway 10). Additionally, each gateway 10 determines a transfer destination gateway 10 according to a predetermined algorithm, as described above. Thus, the frequency with which transfer processing is executed (also called "transfer frequency") in each gateway 10 varies depending on the transfer destination gateway 10.

Many items of data are sent per unit time to a transfer destination gateway 10 with a high transfer frequency, while few items of data are sent per unit time to a transfer destination gateway 10 with a low transfer frequency. If items of data accumulated for the same period of time are integrated together and sent regardless of the transfer destination gateway 10, the degree by which plural items of data to be transferred to a transfer destination gateway 10 with a low transfer frequency are integrated in one or plural packets is lower than that for other transfer destination gateways 10.

The degree of integrating plural items of data in one or plural packets will be called "integration degree".

In the example in FIG. 3, in the gateway 10-9, the transfer frequency for a transfer destination (gateway 10-13), for example, is lower than that for the other transfer destinations. The gateway 10-9 accumulates items of data to be transferred to the gateway 10-13 for the same period of time as the other destinations in spite of a low data integration degree for the gateway 10-13. This decreases the data integration efficiency and also increases the time taken to execute data sending processing (hereinafter also called "sending time").

[Overview of Embodiment]

In this embodiment, each gateway (data transfer device) 10 determines a transfer destination node (gateway 10) to which received data is transferred. The gateway 10 then accumulates items of data for a waiting time, which is determined according to the individual transfer destination node, and sends the accumulated plural items of data together to the transfer destination node.

In this manner, each gateway 10 in this embodiment has a waiting time for accumulating items of data, which is determined according to the individual transfer destination node (gateway 10). The gateway 10 sets a short waiting time for a transfer destination node of a low integration degree so as to efficiently integrate data and to thereby reduce the network load. The gateway 10 may also sufficiently avoid an increase in the sending time.

Figure 4:
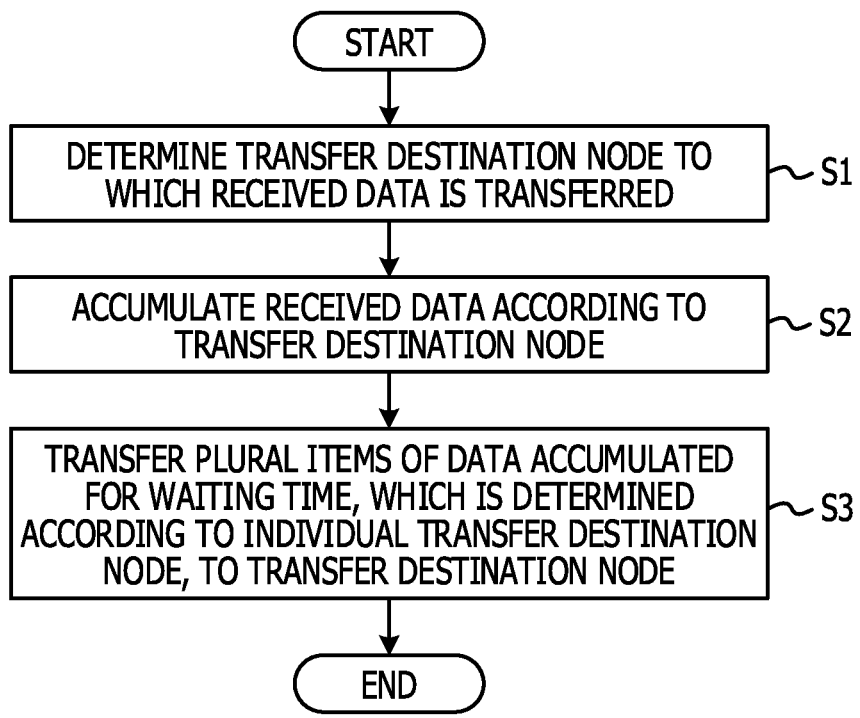
FIG. 4 is a flowchart illustrating an overview of data transfer processing in this embodiment.

FIG. 4 is a flowchart illustrating an overview of data transfer processing in this embodiment.

S1: The gateway 10 determines a transfer destination node (gateway 10) to which data received from a beacon 30 or another gateway 10 is transferred. As discussed with reference to FIG. 3, the gateway 10 determines a transfer destination gateway 10 according to a predetermined algorithm, for example.

S2: The gateway 10 accumulates items of data for the transfer destination node (gateway 10) determined in step S1. The gateway 10 sequentially stores items of data received for a waiting time.

S3: The gateway 10 sends plural items of data accumulated for the waiting time, which is determined for the individual transfer destination node (gateway 10), to the transfer destination node. In this data transfer processing, plural items of data are integrated into one or plural packets, and thus, fewer packets are generated, thereby reducing the network load.

If the same waiting time is set regardless of the transfer destination node (also called "transfer destination") and is set to be long for enhancing the data integration degree, the waiting time for all transfer destinations is increased. For a transfer destination to which few items of data are transferred per unit time, the time for holding data is the same as for the other transfer destinations in spite of a low data integration degree for this transfer destination. As a result, the data sending time is inefficiently increased.

If the waiting time is set to be short to reduce the sending time, the waiting time for all transfer destinations is decreased. The waiting time for a transfer destination to which many items of data are transferred per unit time is also decreased. The data integration degree for such a transfer destination is not enhanced. Hence, the network load is reduced only partially.

In contrast, in this embodiment, the waiting time is determined according to the individual transfer destination. This enables the gateway 10 to integrate items of data based on the waiting time reflecting the transfer frequency. As a result, the data integration efficiency is enhanced, and also, an increase in the data sending time is sufficiently avoided.

Figure 5:
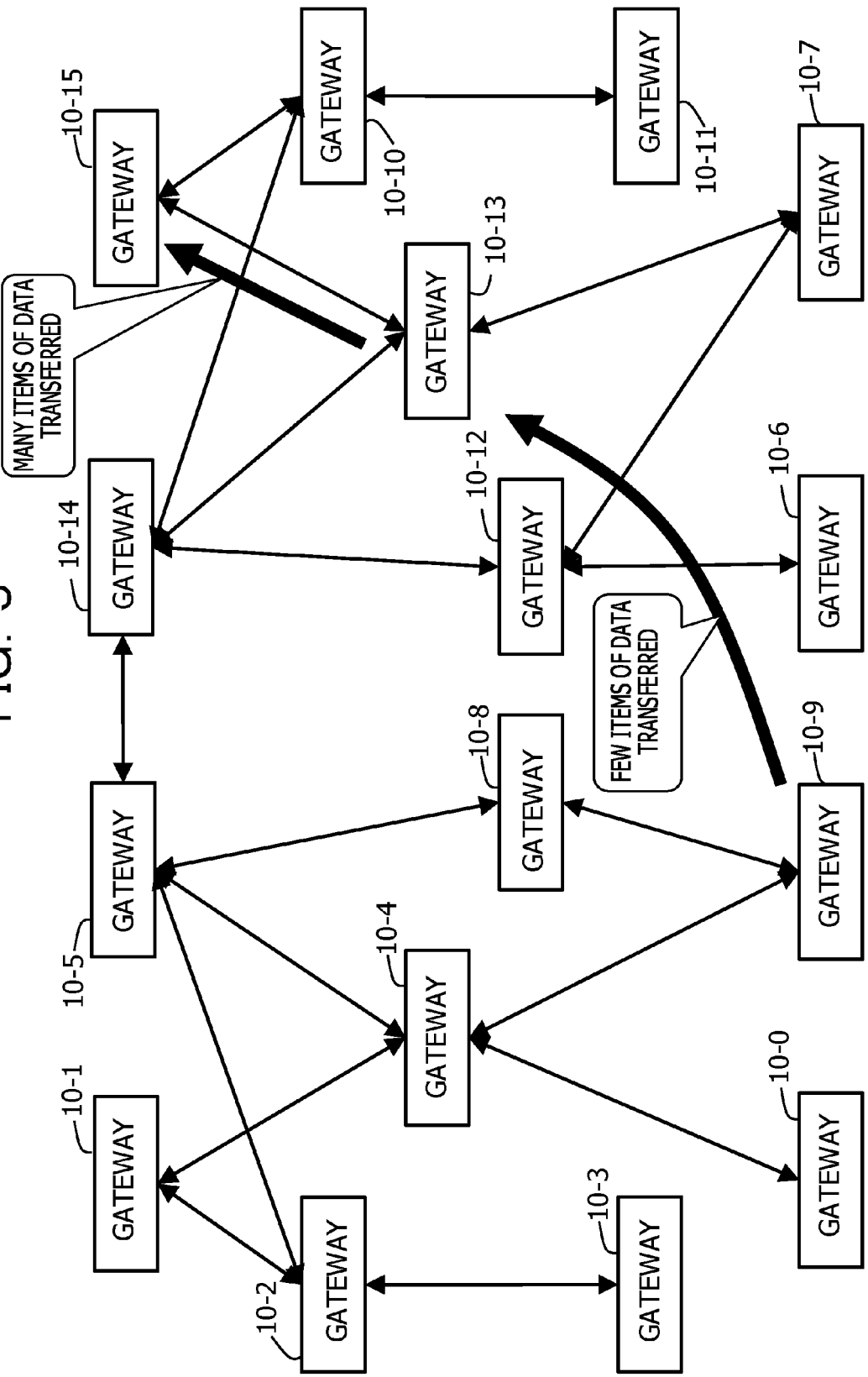
FIG. 5 schematically illustrates an overview of data transfer processing in this embodiment.

FIG. 5 schematically illustrates an overview of data transfer processing in this embodiment. In FIG. 5, the same elements as those illustrated in FIG. 3 are designated by like reference numerals. In the example in FIG. 5, the gateway 10-9 is a sending source node, the gateway 10-15 is a sending destination node, and the gateway 10-13 is a transfer destination node that transfers data.

In this example, few items of data are transferred per unit time in the transfer path "gateway 10-9→gateway 10-13", while many items of data are transferred per unit time in the transfer path "gateway 10-13→gateway 10-15".

For example, when the gateway 10-9 transfers data to the gateway 10-13, it sends items of data accumulated for a waiting time "one second" together to the gateway 10-13. Even if data is accumulated for a long time for a transfer path through which few items of data are transferred per unit time, fewer items of data are integrated. The gateway 10 thus sets a shorter waiting time for such a transfer path so as to sufficiently avoid an increase in the data sending time.

In contrast, when the gateway 10-13 transfers data to the gateway 10-15, it sends items of data accumulated for a waiting time "two seconds" together to the gateway 10-15. If data is accumulated for a long time for a transfer path through which many items of data are transferred per unit time, more items of data are accumulated. The gateway 10 thus sets a longer waiting time for such a transfer path so that the data integration degree will be enhanced and the network load will be reduced.

As described above, in this embodiment, the gateway 10 determines the waiting time according to the individual transfer destination gateway 10. As a result, the data integration efficiency is enhanced, and an increase in the data sending time is sufficiently avoided.

Integrating of data reduces the number of packets. This reduces the occurrences with which session start and end procedures are taken, and the accompanying overhead is reduced accordingly. Additionally, the usage of resources is decreased. For example, if gateway communication is based on transmission control protocol (TCP)/Internet protocol (IP), the number of start and end procedures for a session (connection) such as three-way handshake may be reduced.

If gateway communication is based on hypertext transfer protocol (HTTP), the number of procedures is also reduced. In the case of HTTP protocol, after TCP/IP connection is established, HTTP session processing and HTTP request sending processing are also performed. Procedures based on HTTP protocol involve more processing than those based on TCP/IP protocol, and the load is higher. Reducing of the number of packets further decreases the overhead caused by procedures and thereby reduces the network load.

Integrating of data decreases, not only session procedures, but also the number of times data is sent and received after session is established, thereby further reducing the network load.

Figure 6:
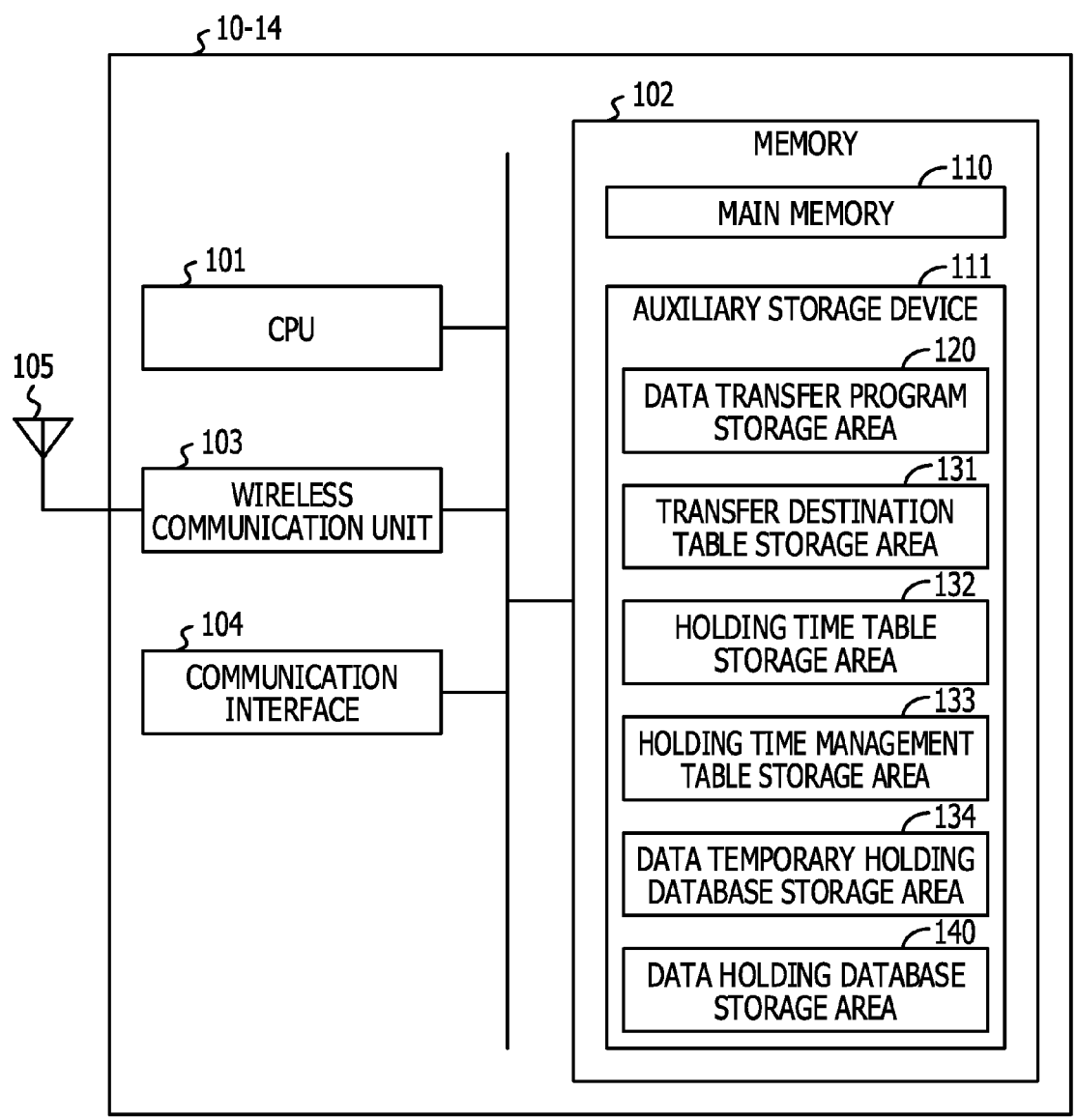
FIG. 6 is a block diagram illustrating the hardware configuration of a gateway 10-14 (data transfer device) in this embodiment.
Figure 7:
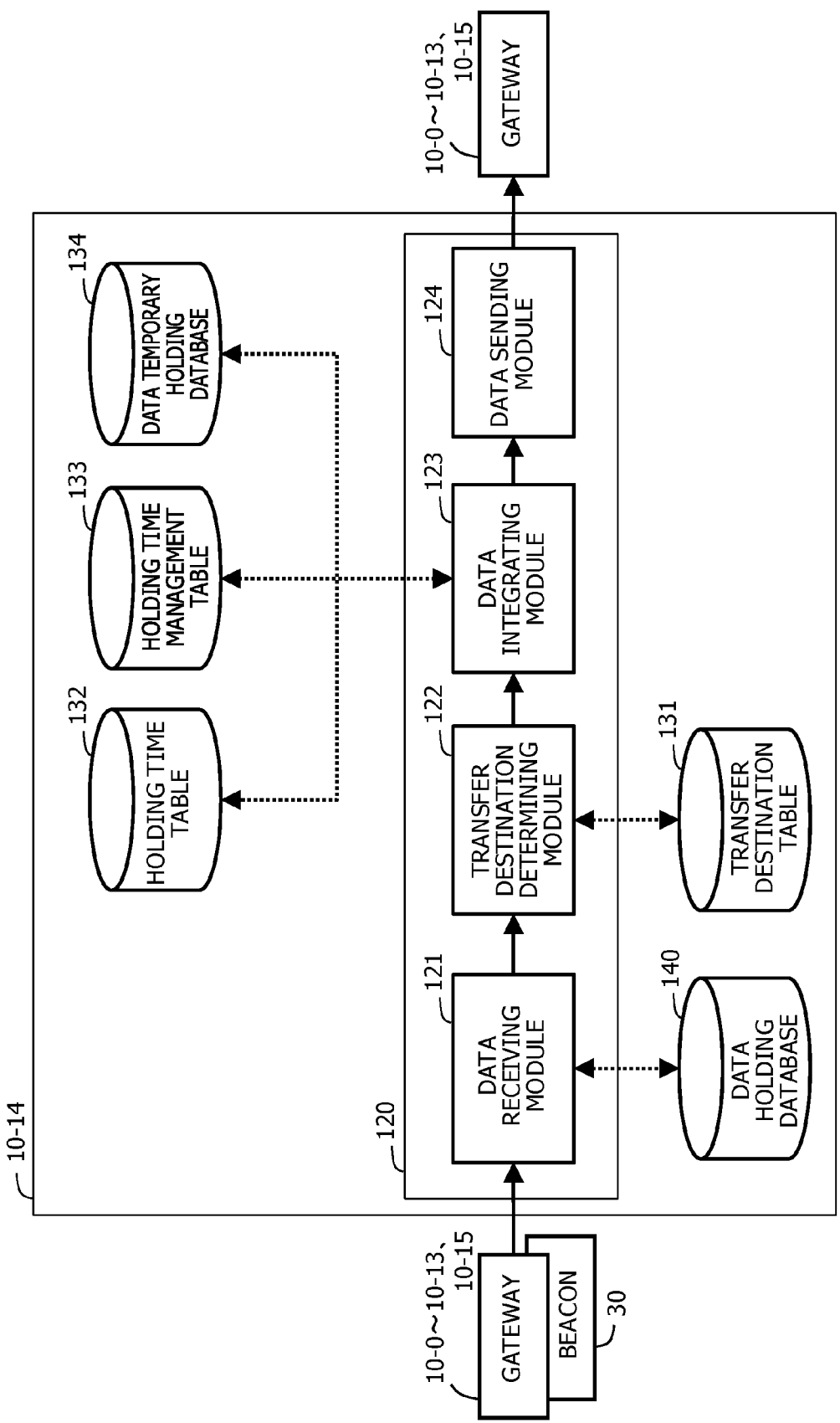
FIG. 7 is a block diagram illustrating the software functional blocks of the gateway 10-14 illustrated in FIG. 6.

The hardware configuration and the software blocks of the gateway 10 (data transfer device) in this embodiment will be described below with reference to FIGS. 6 and 7. FIGS. 6 and 7 illustrate the gateway 10-14 among the gateways 10 illustrated in FIG. 5. The hardware configurations and the software blocks of the other gateways 10-0 through 10-13 and 10-15 are similar to those of the gateway 10-14.

[Hardware Configuration of Gateway 10-14]

FIG. 6 is a block diagram illustrating the hardware configuration of the gateway 10-14 (data transfer device). The gateway 10-14 includes a central processing unit (CPU)

101, a memory 102, a wireless communication unit 103, and a communication interface 104. The memory 102 includes, for example, a main memory 110 and an auxiliary storage device 111. The elements of the gateway 10-14 are coupled to one another via a bus 106.

The CPU 101 is coupled to the memory 102, for example, via the bus 106, and controls the entire gateway 10-14. The wireless communication unit 103 receives data transmitted from a beacon 103 via an antenna 105. The communication interface 104 sends and receives data with the other gateways 10-0 through 10-13 and 10-15 and the center server 20 by wired communication. Alternatively, the communication interface 104 may send and receive data with the other gateways 10-0 through 10-13 and 10-15 and the center server 20 by wireless communication.

The main memory 101, which is, for example, a random access memory (RAM), stores data subjected to processing executed by the CPU 101. The auxiliary storage device 111 has an area in which an operating system program executed by the CPU 101 is stored (not illustrated). The auxiliary storage device 111 also includes a data transfer program storage area 120, a transfer destination table storage area 131, a holding time table storage area 132, a holding time management table storage area 133, a data temporary holding database storage area 134, and a data holding database storage area 140. The auxiliary storage device 111 is, for example, a hard disk drive (HDD) or a non-volatile semiconductor memory.

A data transfer program in the data transfer program storage area 120 (hereinafter called "data transfer program 120") is loaded into the main memory 110. The CPU 101 executes the data transfer program 120 loaded into the main memory 110 so as to implement data transfer processing in this embodiment.

A transfer destination table in the transfer destination table storage area 131 (hereinafter called "transfer destination table 131") indicates address information concerning addresses of plural transfer destination gateways 10. An example of the transfer destination table 131 will be discussed later with reference to FIG. 12. A holding time table in the holding time table storage area 132 (hereinafter called "holding time table 132") indicates a holding time (waiting time) for each transfer destination gateway 10. An example of the holding time table 132 will be discussed later with reference to FIG. 15.

A holding time management table in the holding time management table storage area 133 (hereinafter called "holding time management table 133") indicates a remaining holding time (waiting time) for each transfer destination gateway 10. An example of the holding time management table 133 will be discussed later with reference to FIG. 20.

In a data temporary holding database in the data temporary holding database storage area 134 (hereinafter called "data temporary holding database 134"), data held (accumulated) during a holding time is stored for each transfer destination gateway 10. An example of the data temporary holding database 134 will be discussed later with reference to FIG. 14.

In a data holding database in the data holding database storage area 140 (hereinafter called "data holding database 140"), data to be held for a register gateway 10 is stored for each beacon 30. An example of the data holding database 140 will be discussed later with reference to FIG. 9.

[Software Functional Blocks of Gateway 10-14]

FIG. 7 is a block diagram illustrating the software functional blocks of the gateway 10-14 illustrated in FIG. 6. In FIG. 7, the same elements as those illustrated in FIG. 6 are designated by like reference numerals. The data transfer program 120 illustrated in FIG. 7 includes a data receiving module 121, a transfer destination determining module 122, a data integrating module 123, and a data sending module 124.

The data receiving module 121 receives data transmitted from a beacon 30 via the wireless communication unit 103. The data receiving module 121 also receives data or instructions from the other gateways 10-0 through 10-13 and 10-15 and the center server 20 (not illustrated in FIG. 7) via the communication interface 104. If the gateway 10-14 is a register gateway for data received by the data receiving module 121, the data receiving module 121 stores this data in the data holding database 140.

The transfer destination determining module 122 refers to the transfer destination table 131 and determines a transfer destination gateway 10 to which received data is transferred.

The data integrating module 123 stores and accumulates received data in the data temporary holding database 134 according to the individual transfer destination gateway 10 determined by the transfer destination determining module 122. Referring to the holding time table 132 and the holding time management table 133, the data integrating module 123 obtains plural items of data accumulated for a waiting time, which is determined for the individual transfer destination gateway 10 from the data temporary holding database 134, and integrates the obtained items of data.

The data sending module 124 transfers the items of data integrated by the data integrating module 123 to one of the transfer destination gateways 10-0 through 10-13 and 10-15.

The procedure for data receiving processing executed by the data transfer program 120 illustrated in FIGS. 6 and 7 will be described below with reference to FIGS. 8 through 13.

[Procedure for Processing by Data Transfer Program 120]

Figure 8:
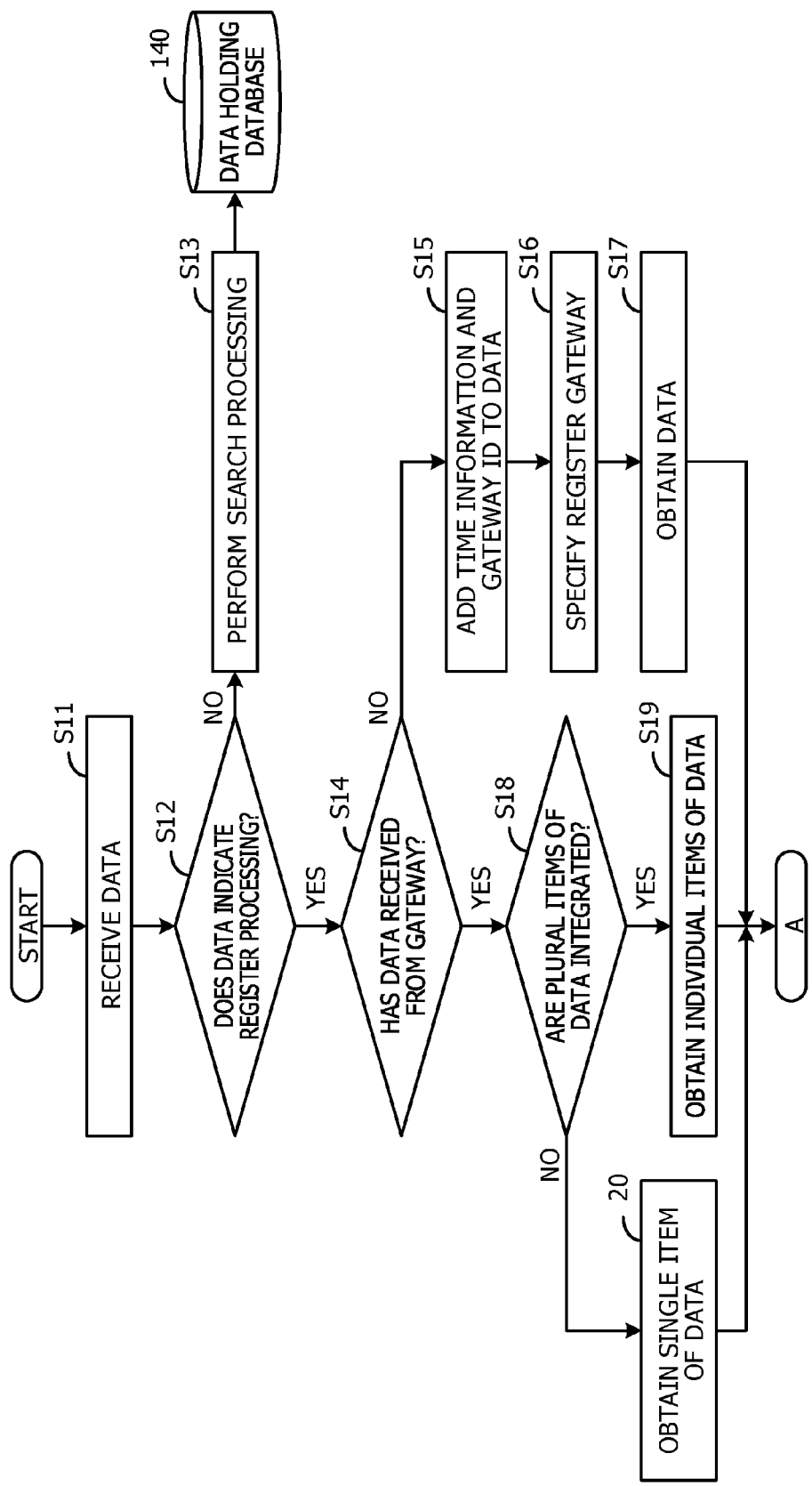
FIG. 8 is a first flowchart illustrating data receiving processing executed by a data transfer program 120 illustrated in FIGS. 6 and 7.

FIG. 8 is a first flowchart illustrating data receiving processing executed by the data transfer program 120 illustrated in FIGS. 6 and 7.

S11: The data receiving module 121 of the data transfer program 120 receives data (hereinafter called "received data") from one of the other gateways 10 (gateways 10-0 through 10-13 and 10-15), the beacons 30, and the center server 20.

S12: The data receiving module 121 determines whether the received data indicates an instruction to perform register processing.

S13: If the received data does not indicate an instruction to perform register processing (No in S12), it means that it indicates an instruction to perform search processing. The data receiving module 121 thus outputs a search instruction to a data search module (not illustrated in FIG. 7) of the data transfer program 120.

The data search module searches for data concerning a beacon 30, which is a search object beacon, from the data holding database 140, and sends a search result to the center server 20. An example of the data holding database 140 will be discussed later with reference to FIG. 9.

S14: If the received data indicates an instruction to perform register processing (Yes in S12), the data receiving module 121 determines whether the sending source of the received data is a gateway 10.

S15: If the sending source of the received data is not a gateway 10 (No in S14), it means that the sending source is a beacon 30. The data receiving module 121 thus adds time information "hhmmss" and the gateway ID of the gateway 10-14 to the data received from the beacon 30.

S16: After step S15, the data receiving module 121 specifies the register gateway 10 corresponding to the received data. More specifically, the data receiving module 121 calculates the hash value by inputting the beacon ID indicated by the received data into the hash function. The data receiving module 121 then specifies the gateway 10 corresponding to the hash value as the register gateway 10.

S17: After step S16, the data receiving module 121 obtains data generated in step S15.

S18: If the sending source is a gateway 10 (Yes in S14), the data receiving module 121 determines whether plural items of data are integrated in the received data.

S19: If plural items of data are integrated (Yes in S18), the data receiving module 121 obtains the individual plural items of data from the received data.

S20: If plural items of data are not integrated (No in S18), the data receiving module 121 obtains the single item of data from the received data. Processing (A) continued from steps S17, S19, or S20 will be discussed later with reference to the flowchart of FIG. 10.

[Data Holding Database 140]

FIG. 9 illustrates an example of the data holding database 140 (FIGS. 6 and 7) discussed with reference to the flowchart of FIG. 8. The data holding database 140 illustrated in FIG. 9 is the data holding database 140 (140-14 in FIG. 2) of the gateway 10-14. The data holding database 140 illustrated in FIG. 9 has data concerning the beacon 30c, for example, that regards the gateway 10-14 as the register gateway 10.

In the example in FIG. 9, the data holding database 140 has time information "14:59:53" and gateway ID "6" as information concerning the beacon ID "beC". The gateway ID is a node ID, which will be discussed later, and is identification information concerning a gateway 10 that has received data transmitted from a beacon 30.

Similarly, the data holding database 140 illustrated in FIG. 9 has time information "14:59:54" and gateway ID "6". In this manner, the data holding database 140 has other items of information concerning the beacon ID "beC".

Figure 10:
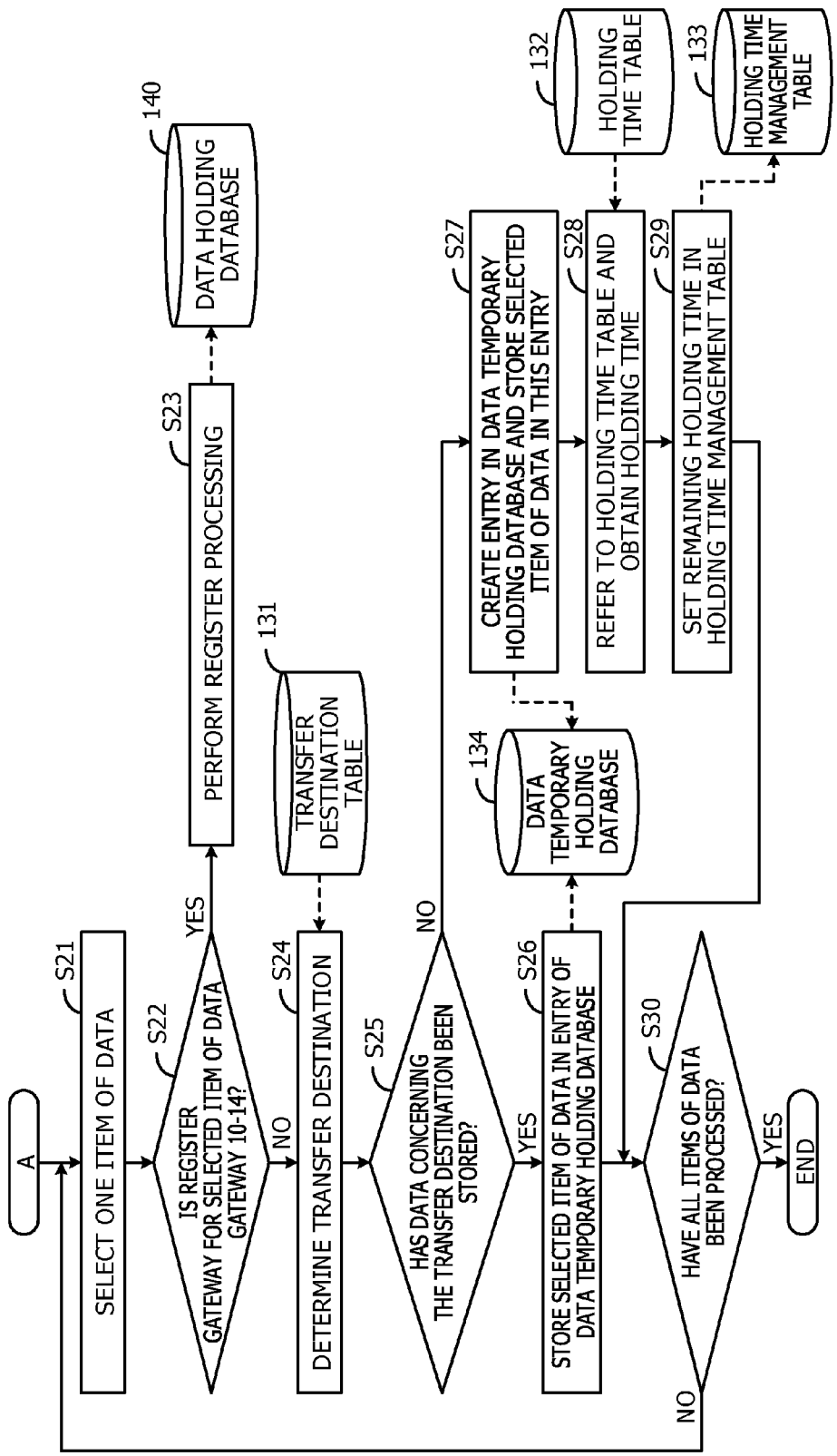
FIG. 10 is a second flowchart illustrating data receiving processing executed by the data transfer program 120.

FIG. 10 is a second flowchart illustrating data receiving processing executed by the data transfer program 120. After steps S17, S19, or S20 of the flowchart in FIG. 8, the data transfer program 120 shifts to step S21.

S21: The transfer destination determining module 122 of the data transfer program 120 selects one item of data from the received data.

S22: The transfer destination determining module 122 determines whether the register gateway 10 of the selected item of data is the gateway 10-14.

S23: If the register gateway 10 is the gateway 10-14 (Yes in S22), the transfer destination determining module 122 stores and registers the selected item of data in the data holding database 140 illustrated in FIG. 9. The transfer destination determining module 122 stores and registers, for example, beacon ID "beC", time information "14:59:57", and gateway ID "6" in the data holding database 140 illustrated in FIG. 9.

S24: If the register gateway 10 is not the gateway 10-14 (No in S22), the transfer destination determining module 122 refers to the transfer destination table 131 and determines the transfer destination gateway 10 to which the selected item of data is transferred.

(S24: Determining of Transfer Destination Gateway 10)

Determining processing for a transfer destination gateway 10 will be discussed below. As described above, the information processing system 100 in this embodiment manages data based on the DHT method. The DHT method has plural algorithms, and one of the algorithms is Chord. In this embodiment, gateway communication is managed according to the Chord DHT method.

Figure 11:
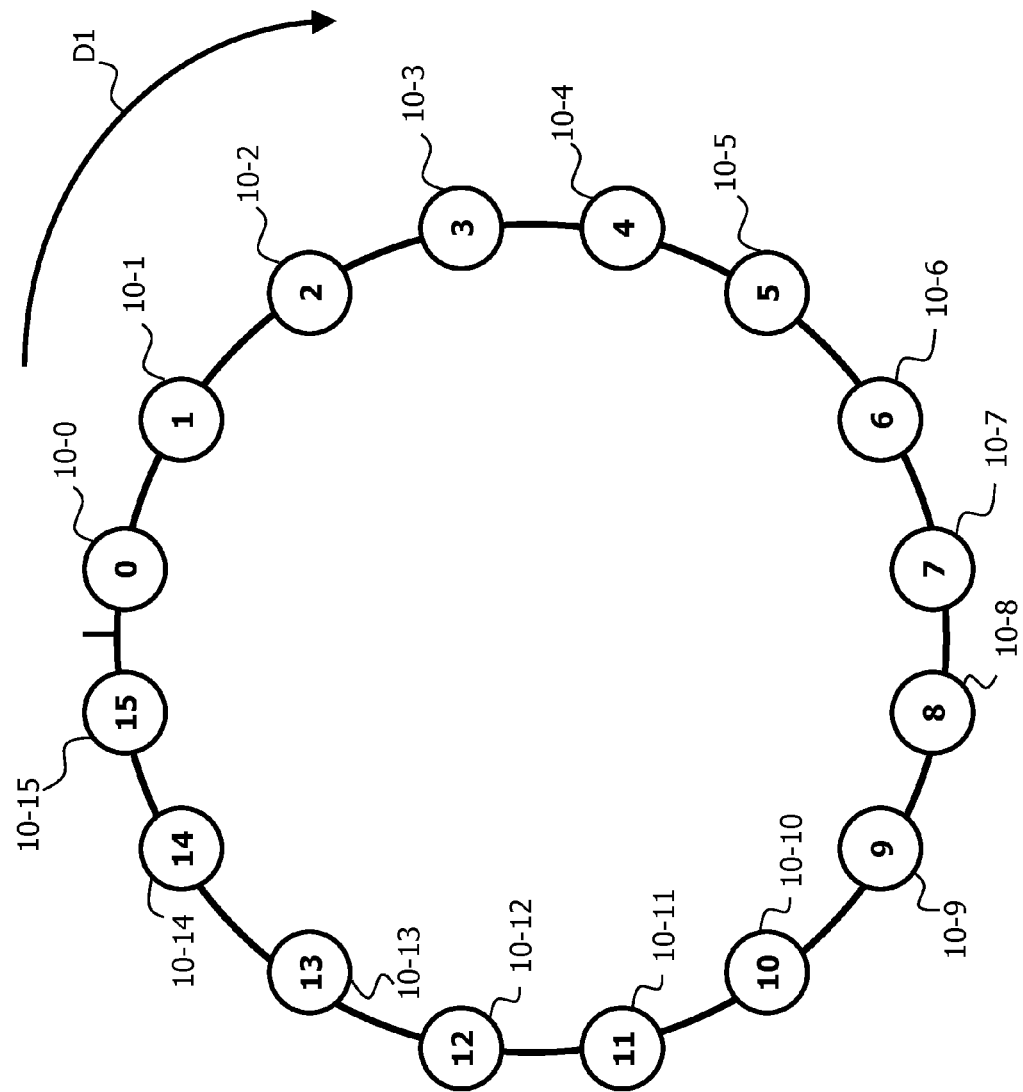
FIG. 11 schematically illustrates an approach to managing gateway communication according to the Chord DHT method.

FIG. 11 schematically illustrates an approach to managing gateway communication according to the Chord DHT method. Node "0" through node "15" (also called "nodes 10-0 through 10-15" or "nodes 10") illustrated in FIG. 11 respectively correspond to the gateways 10-0 through 10-15 illustrated in FIGS. 1 through 3 and 5. The node numbers of node "0" through node "15" represent node IDs (gateway IDs).

In Chord, a sending path between nodes is managed based on a circumferential logical space. The circumferential logical space illustrated in FIG. 11 is a circumference which connects the start node "0" and the end node "15". The nodes 10 are associated with positions (0 to 15 in FIG. 11) aligned in the clockwise direction D1 of the circumference. The positional relationships on the circumference are not physical positional relationships among the nodes 10, but logical positional relationships among the nodes 10. The hash value calculated by inputting a beacon ID into a hash function corresponds to a position on the circumference. A node 10 holding this beacon ID is a node 10 associated with the position corresponding to the calculated hash value.

In Chord, the difference (values "+1", "+2", . . . , "+15") between node numbers (0 through 15 in FIG. 11) in the clockwise direction D1 is called the distance between nodes. The distance between nodes is a logical distance.

(Transfer Destination Table 131)

FIG. 12 illustrates an example of the transfer destination table 131 (FIGS. 6 and 7) based on Chord. If sixteen nodes 10 are disposed, the transfer destination table 131 of each node 10 stores the addresses of node numbers corresponding to the values "$2^i$ (i=0 to 3)" which represent the distance between this node and node "N". That is, the transfer destination table 131 of node "N" has the addresses of nodes "N+1", "N+2", "N+4", and "N+8".

Thus, the transfer destination table 131 stores the addresses of "+1 node", "+2 node", "+4 node", and "+8 node", as illustrated in FIG. 12. More specifically, the transfer destination table 131 of node "14" (gateway 10-14) has the addresses of node "15", node "0", node "2", and node "6".

In the example in FIG. 12, the address of "+1 node" is value "a.a.a.a", and the address of "+2 node" is value "b.b.b.b". Similarly, the transfer destination table 131 has address information concerning the addresses of other nodes 10. As illustrated in FIG. 12, the transfer destination table 131 does not store the addresses of all the nodes 10, but discretely stores the addresses of some of the nodes 10. This reduces the size of the transfer destination table 131.

(Sending Path)

Figure 13:
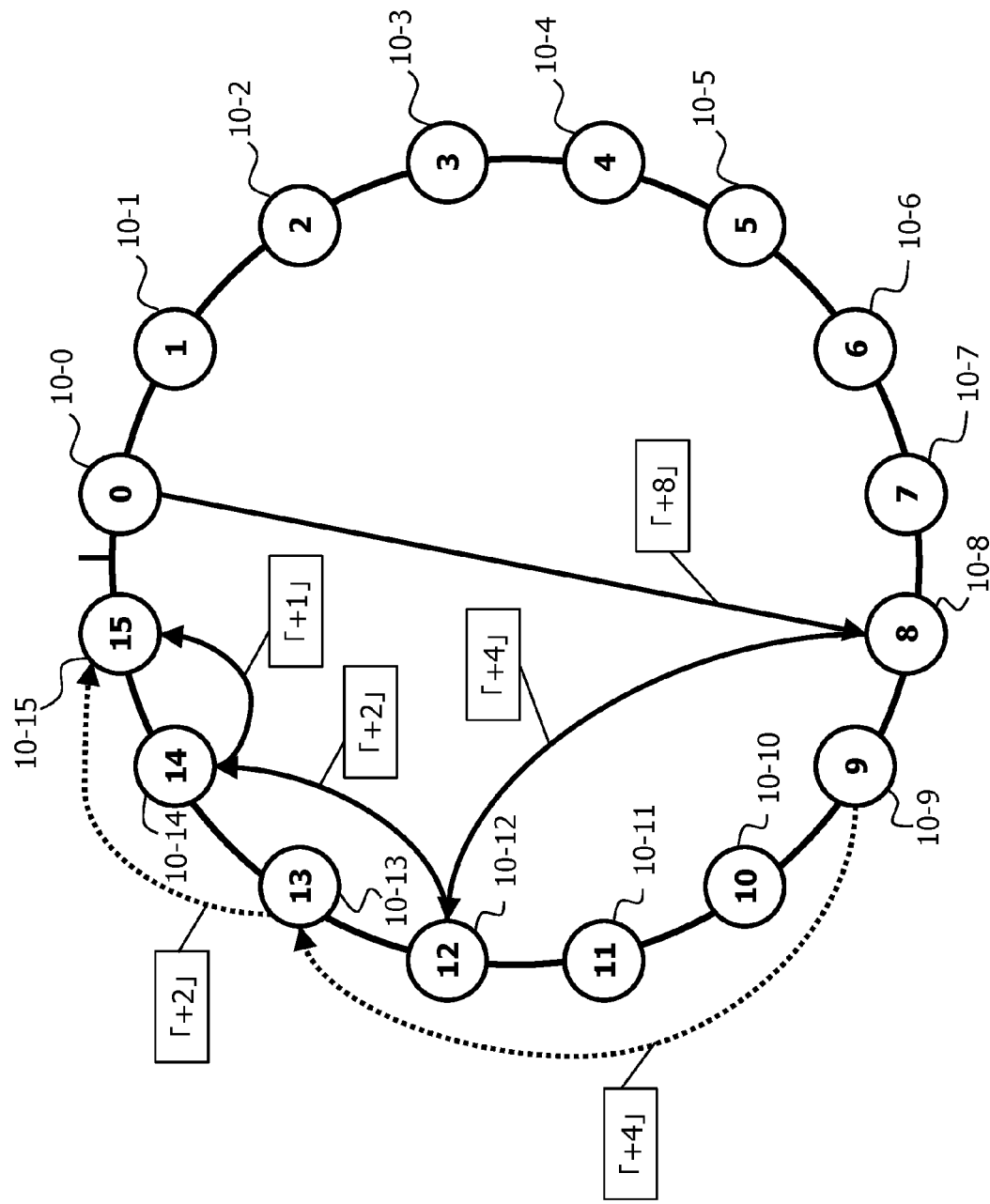
FIG. 13 illustrates an example of a sending path based on Chord.

FIG. 13 illustrates an example of a sending path based on Chord. A node 10 determines a next transfer destination node from among plural candidate nodes having the addresses stored in the transfer destination table 131 illustrated in FIG. 12. More specifically, the node 10 determines, as the transfer destination, a candidate node which is positioned between the node 10 and a sending destination node in the clockwise direction and which is positioned closest to the sending destination node. That is, as the transfer destination, the node 10 determines the candidate node positioned closest to the sending destination node within a ring or an arc from the node 10 to the sending destination node.

A first example of the sending path is the path discussed with reference to FIG. 2 in which node "0" (gateway 10-0) is the sending source and node "15" (gateway 10-15) is the sending destination. The transfer destination table 131 of node "0" stores the addresses of nodes "1(+1)", "2(+2)", "4(+4)", and "8(+8)". Node "0" thus determines, as the first transfer destination, node "8(+8)" positioned closest to node "15" within a ring having a distance "+15" from node "0" to node "15".

The transfer destination table 131 of node "8" stores the addresses of nodes "9(+1)", "10(+2)", "12(+4)", and "0(+8)". Node "8" thus determines, as the second transfer destination, node "12(+4)" positioned closest to node "15" within an arc having a distance "+7" from node "8" to node "15". Similarly, node "12" determines node "14(+2)" among nodes "13(+1)", "14(+2)", "0(+4)", and "4(+8)" as the third transfer destination. Node "14" has the address of node "15(+1)".

The sending path from sending source node "0" to sending destination node "15" is a path "node '0'→node '8(+8)'→node '12(+4)'→node '14(+2)'→node '15(+1)'", as indicated by the solid lines in FIG. 13. That is, this sending path is a path through which data is transferred via transfer destination nodes "8", "12", and "14".

A second example of the sending path is the path discussed with reference to FIG. 2 in which node "9" (gateway 10-9) is the sending source and node "15" (gateway 10-15) is the sending destination. As a result of determining transfer destinations similarly to the first example, the sending path from node "9" to node "15" is a path "node '9'→node '13(+4)'→node '15(+2)'", as indicated by the dotted lines in FIG. 13.

In this manner, as step S24 in FIG. 10, the gateway 10 determines a transfer destination gateway (node) 10 based on the transfer destination table 131 illustrated in FIG. 12. Referring back to the flowchart in FIG. 10, the subsequent processing will be described.

S25: after step S24, the data integrating module 123 of the data transfer program 120 determines whether data concerning the determined transfer destination is already stored in the data temporary holding database 134. That is, the data integrating module 123 determines whether the data temporary holding database 134 has an entry for the determined transfer destination. An example of the data temporary holding database 134 will be discussed later with reference to FIG. 14.

S26: If the data temporary holding database 134 has an entry for the determined transfer destination (Yes in S25), the data integrating module 123 adds the selected item of data to this entry.

S27: If the data temporary holding database 134 does not have an entry for the determined transfer destination (No in S25), the data integrating module 123 creates an entry for the determined transfer destination in the data temporary holding database 134 and stores the selected item of data in this entry.

S28: After step S27, the data integrating module 123 refers to the holding time table 132 and obtains the holding time (waiting time) for the determined transfer destination. An example of the holding time table 132 will be discussed later with reference to FIG. 15.

In this embodiment, the holding time (waiting time) for a transfer destination node is determined according to the number of items of data transferred to this transfer destination node per unit time. The data integrating module 123 is thus able to determine a suitable holding time for a transfer destination node reflecting the number of items of data transferred to this transfer destination. As a result, the data integration efficiency is enhanced, and also, an increase in the data sending time is sufficiently avoided.

In this embodiment, a holding time (waiting time) for a first transfer destination node is longer than that for a second transfer destination node to which fewer items of data are transferred per unit time than to the first transfer destination node. That is, the holding time is longer for a transfer destination to which more items of data are transferred per unit time.

In this manner, setting of a longer holding time for the first transfer destination node to which more items of data are transferred allows more items of data to be accumulated, thereby significantly enhancing the data integration degree. Setting of a shorter holding time for the second transfer destination node to which fewer items of data are transferred may sufficiently avoid an increase in the data sending time, which would otherwise be caused by inefficiently waiting for a long time even with a low integration degree.

S29: After step S28, the data integrating module 123 sets the holding time for the determined transfer destination in the holding time management table 133 and starts to count the remaining holding time. An example of the holding time management table 133 will be discussed later with reference to FIG. 20.

S30: The data integrating module 123 determines whether all items of data included in the received data have been processed. If any item of data has not been processed (No in S30), the data transfer program 120 returns to step S21 and selects an item of data that has not been processed. The data transfer program 120 then executes steps S22 through S29. If all items of data included in the received data have been processed (Yes in S30), the data transfer program 120 completes data receiving processing.

In this embodiment, as discussed with reference to FIGS. 1 and 2, the obtained data is sent from a sending source node to a sending destination node via a transfer destination node in a node network including plural nodes 10 and paths between nodes.

The sending path from a sending source node to a sending destination node in a node network varies according to the sending source node and the sending destination node. The number of transfer paths included in a sending path differs according to the transfer path, and thus, the number of items of data transferred to a transfer destination per unit time also differs according to the transfer destination. Determining of the holding time according to the transfer destination makes it possible to enhance the data integration efficiency.

[Data Temporary Holding Database 134]

FIG. 14 illustrates an example of the data temporary holding database 134 (FIGS. 6 and 7) discussed in steps S25 through S27 of the flowchart in FIG. 10. The data temporary holding database 134 temporarily stores transferring data as holding data according to the transfer destination.

The holding data indicates the gateway ID (node ID) representing a register gateway 10 and register data (data) to be registered in the register gateway 10. The register data indicates the gateway ID (node ID) of a gateway 10 that has received data transmitted from a beacon 30, beacon ID of the beacon 30, and time information.

The data temporary holding database 134 in FIG. 14 indicates that the holding data for "+1 node" is data "15, data (0, beA, 14:59:56)" and "15, data (0, beA, 14:59:59)".

The data "15, data (0, beA, 14:59:56)" indicates that node "0" received data from the beacon 30a at time "14:59:56" and that the register gateway 10 of the beacon 30a is node "15". Similarly, the data "15, data (0, beA, 14:59:59)" indicates that node "0" received data from the beacon 30a at time "14:59:59" and that the register gateway 10 of the beacon 30a is node "15".

The data temporary holding database 134 in FIG. 14 indicates that the holding data for "+2 node" is data "1, data (6, beD, 14:59:58)". The data "1, data (6, beD, 14:59:58)" indicates that node "6" received data from the beacon 30d at time "14:59:58" and that the register gateway 10 of the beacon 30d is node "1". Similarly, the data temporary holding database 134 has holding data for other nodes.

[Holding Time Table 132]

FIG. 15 illustrates an example of the holding time table 132 (FIGS. 6 and 7) discussed in step S28 of the flowchart in FIG. 10. The holding time table 132 indicates the holding time (waiting time) for each transfer destination indicated by the transfer destination table 131 illustrated in FIG. 12.

The holding time table 132 illustrated in FIG. 15 indicates that the holding time for "+1 node" is time "4 seconds", the holding time for "+2 node" is time "2 seconds", the holding time for "+4 node" is time "1 second", and the holding time for "+8 node" is time "1/2 seconds". In this manner, in this embodiment, the holding time for a transfer destination having a shorter distance from a transfer source is longer than that for a transfer destination having a longer distance from a transfer source.

As discussed above, a subject node determines, as a transfer destination, a node which is positioned between the subject node and a sending destination node in the clockwise direction and which is positioned closest to the sending destination node. In a data sending path, the distance between a transfer source node and a transfer destination node becomes shorter as data is transferred more times. In the sending path from node "0" to node "15" illustrated in FIG. 13, the distance from the transfer source to the transfer destination shits as in the distance "+8", "+4", "+2", and "+1".

As the distance of the sending path is longer, the number of transfer times (the number of hops) in sending processing is likely to be greater. As the distance of the sending path is shorter, the number of transfer times (the number of hops) in sending processing is likely to be smaller. As discussed above, the distance of a transfer path becomes shorter as data is transferred more times. Consequently, a sending path in which data is transferred more times is highly likely to include a long transfer path than a sending path in which data is transferred less times. Any sending path is highly likely to include a short transfer path regardless of the number of transfer times.

Hence, the transfer frequency of a transfer destination having a short distance from a transfer source is greater than that of a transfer destination having a long distance from a transfer source. That is, in Chord, the number of items of data transferred to a transfer destination having a shorter distance from a transfer source is greater than that to a transfer destination having a longer distance from a transfer source. The numbers of items of data transferred to transfer destinations will be discussed later with reference to FIGS. 16 through 18.

Utilizing the characteristics of Chord in this manner makes it possible to determine the number of items of data to be transferred to a transfer destination per unit time, based on the distance from a transfer source to the transfer destination. The gateway 10 in this embodiment is thus able to determine a suitable holding time for each transfer destination in accordance with the number of items of data determined based on the distance from a transfer source to the transfer destination.

Then, the gateway 10 sets a shorter holding time (waiting time) for a transfer destination having a long distance from a transfer source, and sets a longer holding time (waiting time) for a transfer destination having a short distance from a transfer source. As discussed above, Chord defines that few items of data are transferred to a transfer destination having a long distance from a transfer source. The gateway 10 thus sets a shorter holding time for a transfer destination having a long distance from a transfer source gateway, thereby giving higher priority to a decrease in the sending time than to the data integration degree.

As discussed above, Chord defines that many items of data are transferred to a short transfer path. The gateway 10 thus sets a longer holding time (waiting time) for a short transfer path, thereby giving higher priority to the enhancement of the data integration degree than to a decrease in the sending time.

If the holding time is uniform regardless of the transfer destination, the sending time in a sending path through which data is transferred many times becomes long. The gateway 10 in this embodiment sets a shorter holding time for a transfer destination having a long distance from a transfer source gateway. As discussed above, a sending path through which data is transferred many times is highly likely to include a long transfer path.

Setting of a shorter holding time for a transfer destination having a long distance may sufficiently avoid an increase in the sending time in a sending path through which data is transferred many times. In this manner, unlike a case in which the holding time is uniformly set, it is possible to reduce a difference in the sending time among plural sending paths having different transfer times.

The number of items of data transferred to a transfer destination according to the distance from a transfer source to the transfer destination based on Chord will be described below with reference to FIGS. 16 through 18.

(Number of Items of Data According to Distance to Transfer Destination)

Figure 16:
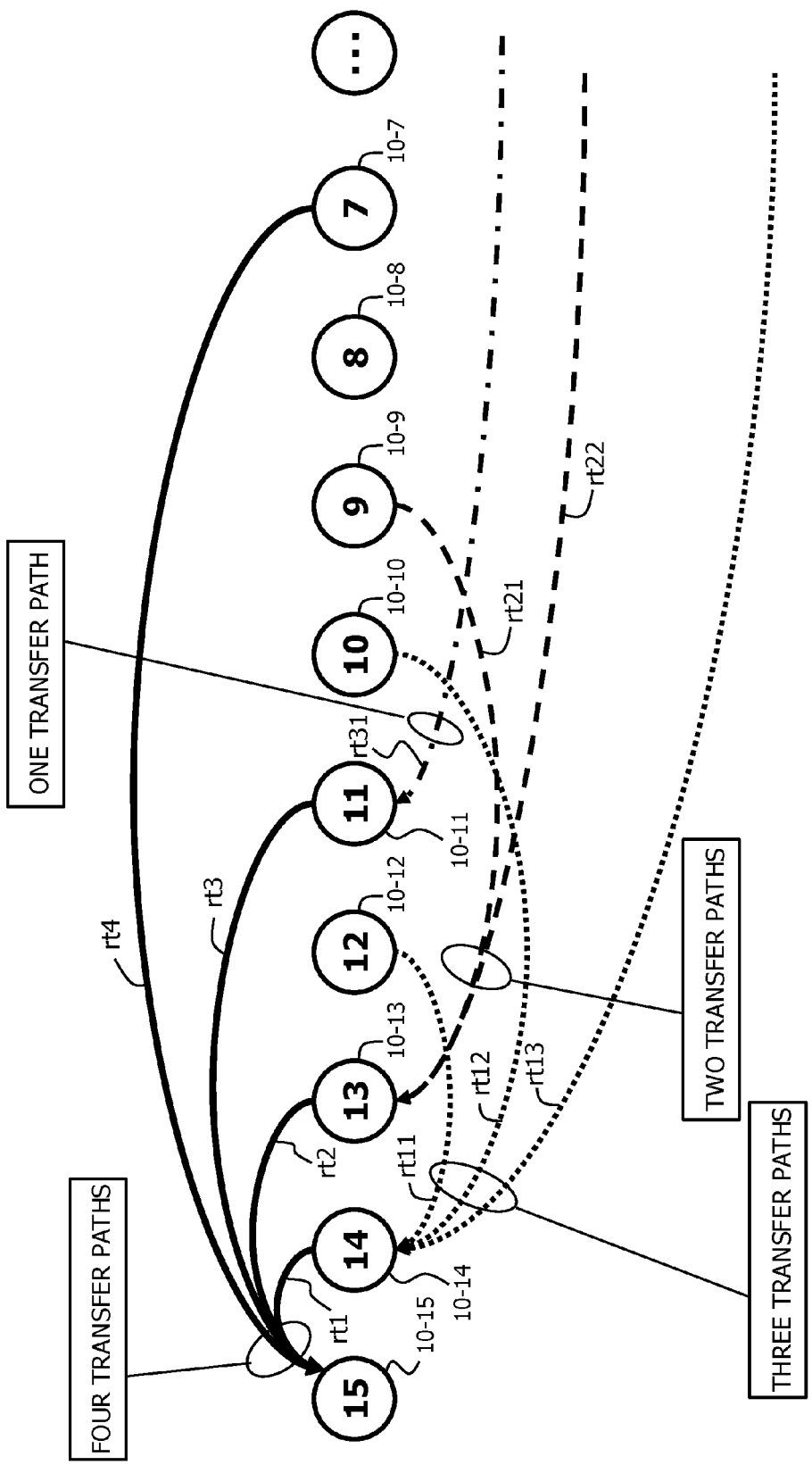
FIG. 16 schematically illustrates plural sending paths in which all sending destination nodes are the same, that is, node "15", and sending source nodes are different.

FIG. 16 schematically illustrates plural sending paths in which all sending destination nodes are the same, that is, node "15", and sending source nodes are different. FIG. 16 illustrates part of the circumference represented in FIGS. 11 and 13. As illustrated in FIG. 16, there are many sending paths having node "15" as the sending destination from different sending source nodes.

Among plural transfer paths included in the sending paths in FIG. 16, transfer paths having node "15" as a transfer destination will be focused. Four transfer paths rt1 through rt4 indicated by the thick lines in FIG. 16 are transfer paths having node "15" as a transfer destination. More specifically, the four transfer paths rt1 through rt4 respectively have node "14(+1)", node "13(+2)", node "11(+4)", and node "7(+8)" as the transfer sources.

The number of transfer paths that have been generated before the transfer source differs in accordance with the transfer paths rt1 through rt4. More specifically, the transfer path "node '14'→node '15'" rt1 is generated after one of three transfer paths rt11 through rt13 indicated by the dotted lines in FIG. 16. The transfer path "node '13'→node '15'" rt2 is generated after one of two transfer paths rt21 and rt22 indicated by the dashed lines in FIG. 16.

The transfer path "node '11'→node '15'" rt3 is generated after one transfer path rt31 indicated by the long dashed dotted line in FIG. 16. No transfer path has been generated before the transfer path "node '7'→node '15'" rt4. In this manner, more transfer paths have been generated before a shorter transfer path. The presence of many transfer paths before a certain transfer path means that many items of data transferred to this transfer path per unit time.

Figure 17:
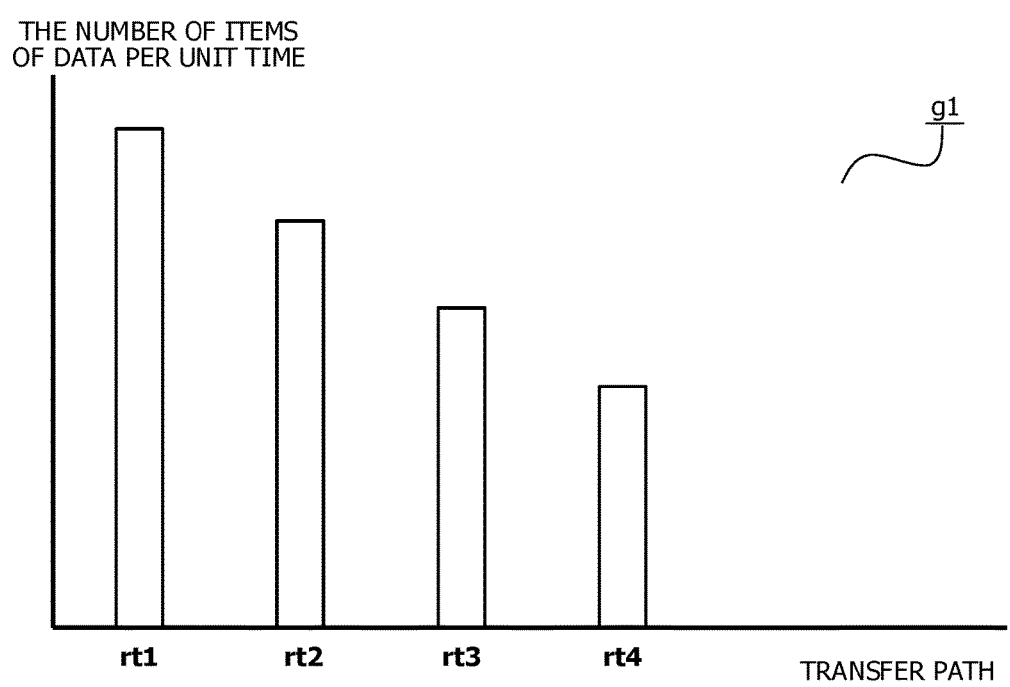
FIG. 17 is a graph illustrating the numbers of items of data transferred per unit time to transfer paths rt1 through rt4 discussed with reference to FIG. 16 having node "15" as a transfer destination.

FIG. 17 is a graph g1 illustrating the numbers of items of data transferred per unit time to the transfer paths rt1 through rt4 discussed with reference to FIG. 16 having node "15" as a transfer destination. In the graph g1, the horizontal axis indicates the transfer paths rt1 through rt4, while the vertical axis indicates the number of items of data transferred per unit time.

The graph g1 indicates that more items of data are transferred per unit time to a shorter transfer path. More specifically, more items of data are transferred to the transfer path "node '14'→node '15'" rt1 than to the transfer path "node '13'→node '15'" rt2. Similarly, more items of data are transferred to the transfer path "node '13'→node '15'" rt2 than to the transfer path "node '11'→node '15'" rt3. The relationships among the other transfer paths rt1 through rt4 are similar to those described above.

In this manner, in Chord, more items of data are transferred to a transfer destination having a shorter distance from a transfer source. This also applies to the other transfer paths included in the sending paths illustrated in FIG. 16. As other examples of the transfer paths, the transfer paths rt11 through rt13 having node "14" as a transfer destination will be focused.

The three transfer paths rt11 through rt13 indicated by the dotted lines in FIG. 16 are transfer paths having node "14" as a transfer destination. More specifically, the three transfer paths rt11 through rt13 have node "12(+2)", node "10(+4)", and node "6(+8)", respectively, as transfer sources.

As in the transfer paths rt1 through rt4, the number of transfer paths that have been generated before the transfer source differs in accordance with the transfer paths rt11 through rt13. More specifically, the transfer path "node '12'→node '14'" rt11 is generated after one of two transfer paths (not illustrated). The transfer path "node '10'→node '14'" rt12 is generated after one transfer path (not illustrated). No transfer path is generated before the transfer path "node '6'→node '14'" rt13.

Figure 18:
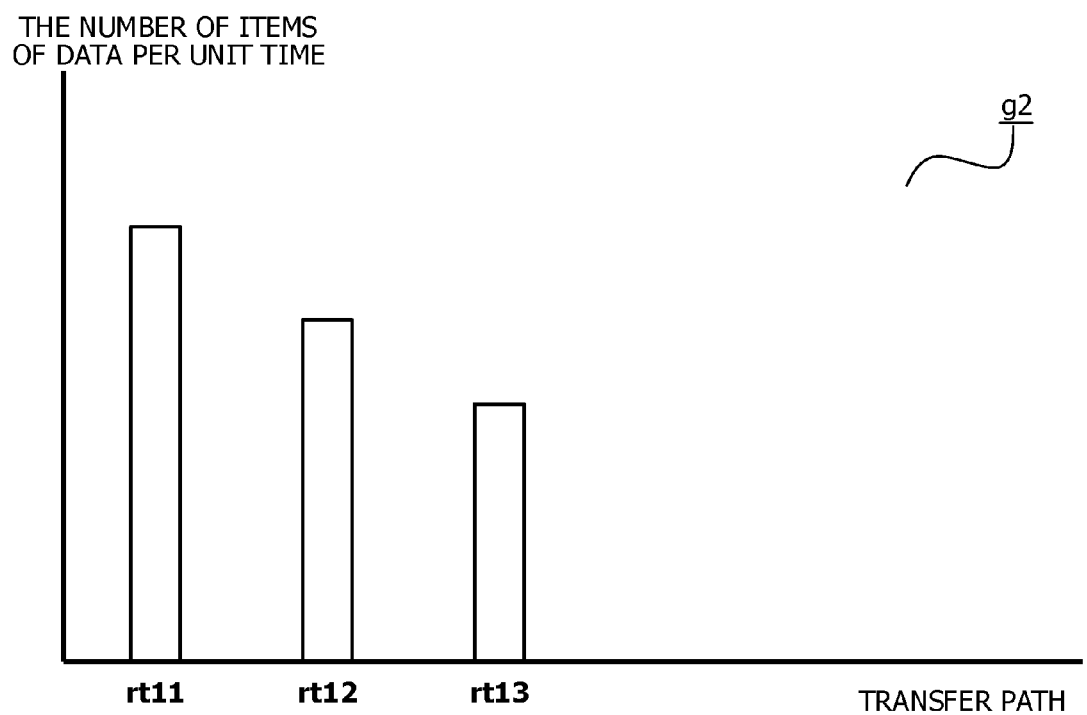
FIG. 18 is a graph illustrating the numbers of items of data transferred per unit time to transfer paths rt11 through rt13 discussed with reference to FIG. 16 having node "14" as a transfer destination.

FIG. 18 is a graph g2 illustrating the numbers of items of data transferred per unit time to the transfer paths rt11 through rt13 discussed with reference to FIG. 16 having node "14" as a transfer destination. In the graph g2, the horizontal axis indicates the transfer paths rt11 through rt13, while the vertical axis indicates the number of items of data transferred per unit time.

As in the graph g1, the graph g2 indicates that more items of data are transferred per unit time to a shorter transfer path. As illustrated in FIGS. 16 through 18, concerning the transfer paths included in the sending paths having the same sending destination node "15" illustrated in FIG. 16, more items of data are transferred per unit time to a shorter transfer path.

(Data Transfer Processing Based on Holding Time Table 132)

Figure 19:
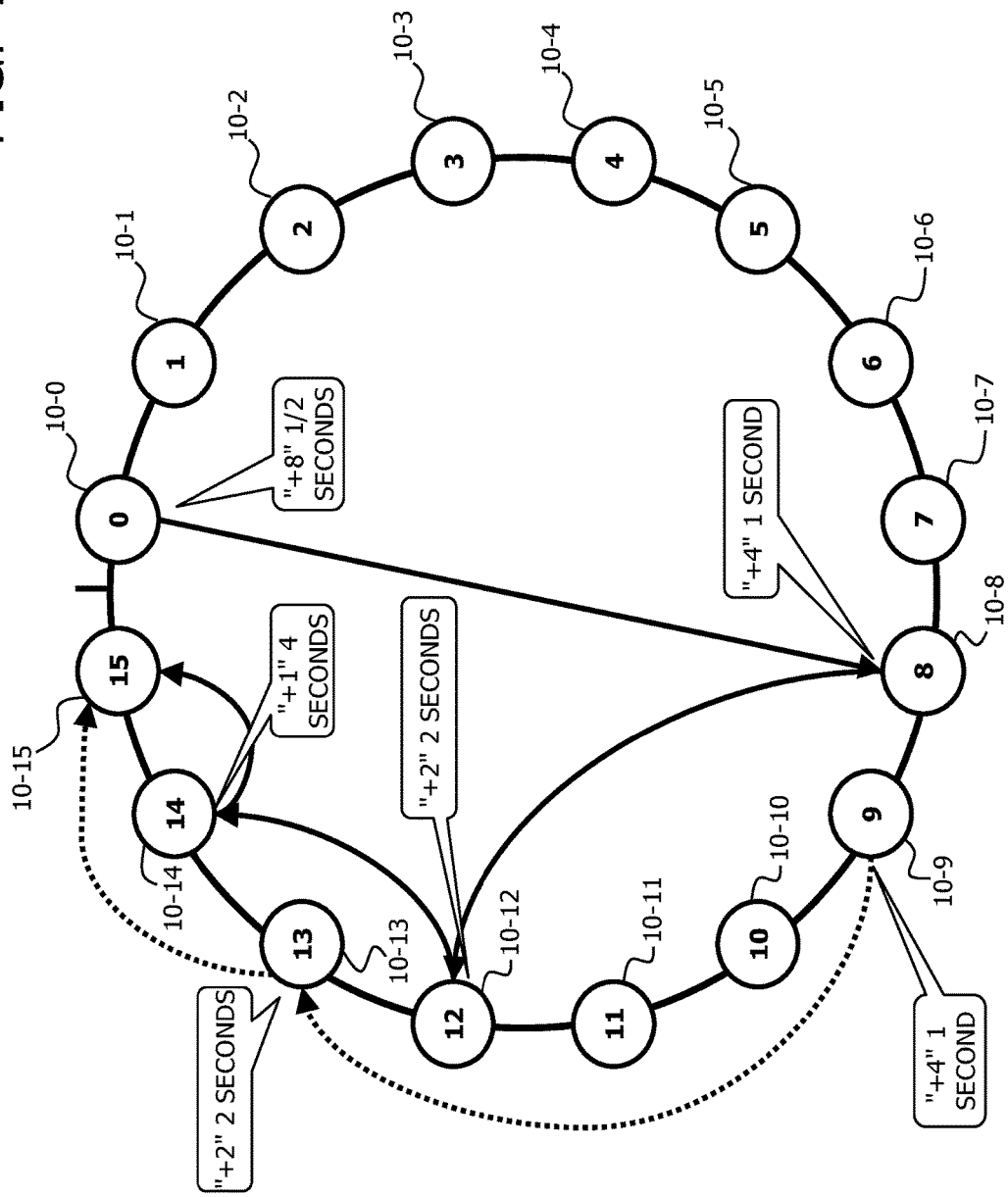
FIG. 19 schematically illustrates data transfer processing based on the holding time table 132 illustrated in FIG. 15.

FIG. 19 schematically illustrates data transfer processing based on the holding time table 132 illustrated in FIG. 15. FIG. 19 illustrates first and second examples of sending paths, as in the examples illustrated in FIG. 13.

The first sending path indicated by the solid lines in FIG. 19 will be discussed. The holding time table 132 illustrated in FIG. 15 indicates that the holding time for the transfer path "node '0'→node '8'" (+8) is time "1/2 seconds", the holding time for the transfer path "node '8'→node '12'" (+4) is time "1 second", the holding time for the transfer path "node '12'→node '14'" (+2) is time "2 seconds", and the holding time for the transfer path "node '14'→node '15'" (+1) is time "4 seconds".

Node "14" sets a longer holding time for the transfer destination (node "15") having a short distance from node "14" than for the other transfer destinations. Node "14" is thus able to accumulate more items of data, thereby enhancing the data integration degree. Node "0" sets a shorter holding time for the transfer destination (node "8") having a long distance from node "0" than for the other transfer destinations. Thus, node "0" does not have to inefficiently wait for a long time in spite of a low data integration degree for node "8", thereby making it possible to sufficiently avoid an increase in the data sending time.

The second sending path indicated by the dotted lines in FIG. 19 may similarly be explained. As illustrated in FIG. 19, the holding time for the transfer destination (node "13") having distance "+4" is time "1 second", and the holding time for the transfer destination (node "15") having distance "+2" is time "2 seconds".

As explained with reference to FIGS. 15 through 19, the waiting time in this embodiment is determined based on a difference between a position indicated by position information assigned to a transfer source node and a position indicated by position information assigned to a transfer destination node in one circumferential direction. The difference between a position indicated by position information assigned to a transfer source node and a position indicated by position information assigned to a transfer destination node represents the distance between the transfer source node and the transfer destination node.

As discussed above, position information is assigned to each of the plural nodes aligned on an imaginary circumference. Among candidate nodes included in the plural nodes, the gateway 10 in this embodiment determines, as a transfer destination node, a candidate node having a smaller difference between the position indicated by position information assigned to this candidate node and the position indicated by position information assigned to a sending destination node in one circumferential direction.

Then, by utilizing the characteristics of Chord, the gateway 10 is able to determine the number of items of data to be transferred to each transfer destination based on the distance to the transfer destination. This enables the gateway 10 to determine a suitable holding time in accordance with the number of items of data.

In this embodiment, the waiting time for a transfer destination node determined based on a first value indicating the difference between a transfer source node and the transfer destination node is longer than that for a transfer destination node determined based on a second value, which is greater than the first value, indicating the difference between a transfer source node and the transfer destination node. This allows the gateway 10 to enhance the integration degree of data for a transfer destination having a short distance from a transfer source and also to sufficiently avoid an increase in the sending time by decreasing the waiting time for a transfer destination having a long distance from a transfer source. The gateway 10 is also able to reduce the difference in the sending time among plural sending paths.

An example of the holding time management table 133 (FIGS. 6 and 7) illustrated in the flowchart of FIG. 10 will be described below with reference to FIG. 20.

[Holding Time Management Table 133]

FIG. 20 illustrates an example of the holding time management table 133 discussed in step S29 of the flowchart in FIG. 10. The holding time management table 133 illustrated in FIG. 20 is that for the gateway 10-14.

The holding time management table 133 indicates information concerning the remaining holding time for each transfer destination. The holding time management table 133 in FIG. 20 indicates that the remaining holding time for "+1 node" is time "0 seconds", the remaining holding time for "+2 node" is time "1.5 seconds", and the remaining holding time for "+4 node" is time "0.5 seconds".

Data sending processing executed by the data transfer program 120 will be described below with reference to FIG. 21.

[Procedure for Processing by Data Transfer Program 120: Data Sending]

Figure 21:
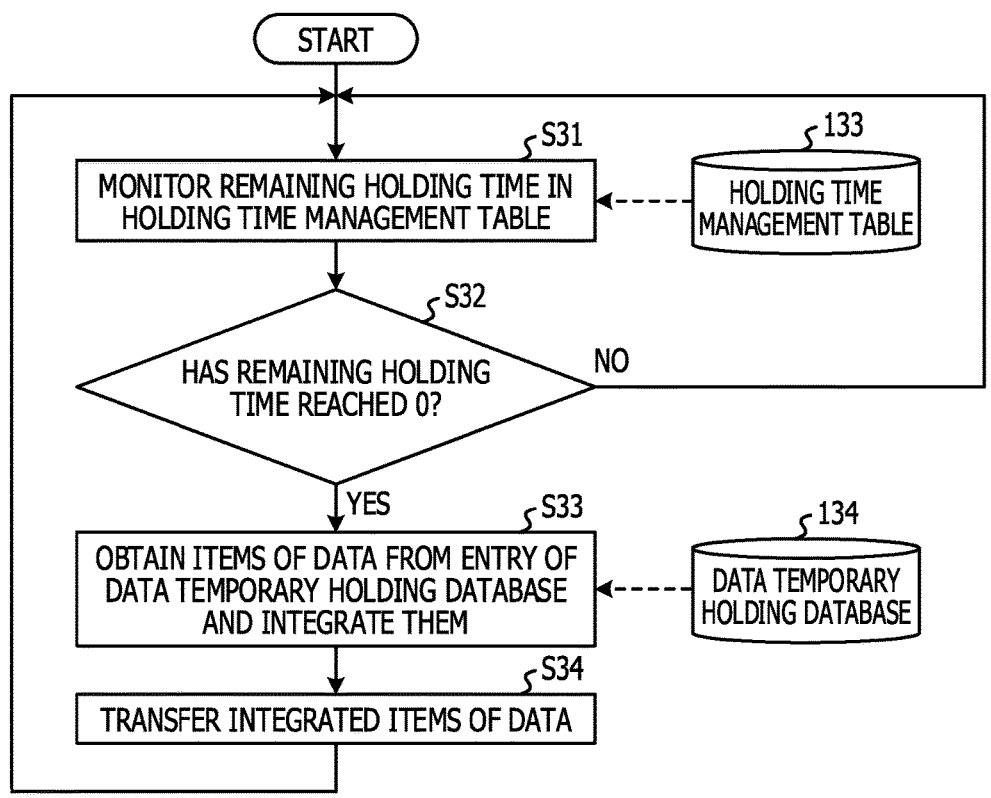
FIG. 21 is a flowchart illustrating data sending processing executed by the data transfer program 120 illustrated in FIGS. 6 and 7.

FIG. 21 is a flowchart illustrating data sending processing executed by the data transfer program 120 illustrated in FIGS. 6 and 7.

S31: The data integrating module 123 regularly monitors the remaining holding time for each transfer destination indicated by the holding time management table 133 illustrated in FIG. 20.

S32: The data integrating module 123 determines whether there is any transfer destination for which the remaining holding time has reached time "0". If such a transfer destination is not found (No in S32), the data integrating module 123 returns to step S31.

S33: If there is a transfer destination for which the remaining holding time has reached time "0" (Yes in S32), the data integrating module 123 obtains items of holding data for this transfer destination from the data temporary holding database 134 and integrates the items of holding data. That is, the data integrating module 123 generates one packet including the integrated items of holding data for a transfer destination for which the remaining holding time has reached "0". Examples of the packets will be discussed later with reference to FIGS. 22A and 22B.

The data integrating module 123 does not necessarily have to integrate plural items of holding data into one packet. If there are many items of holding data, the data integrating module 123 may integrate them into two or more packets.

The holding time management table 133 illustrated in FIG. 20 indicates that the remaining holding time for "+1 node" is value "0 seconds". Thus, the data integrating module 123 generates one packet including two items of holding data for "+1 node" indicated by the data temporary holding database 134 illustrated in FIG. 14, for example.

S34: The data sending module 124 transfers the generated packet (data) to the transfer destination. After step S34, the data transfer program 120 returns to step S31. The holding time management table 133 illustrated in FIG. 20 indicates that the data integrating module 123 will integrate and send items of data for "+4" node as a transfer destination after 0.5 seconds and will integrate and send items of data for "+2" node as a transfer destination after 1.5 seconds.

Integrated plural items of data include, not only data transmitted from one beacon 30, but also data transmitted from another beacon 30. Items of data transmitted from different beacons 30 may be transferred through the same transfer path. Considering items of data transmitted only from a single beacon 30, if X items of data are transmitted from this beacon 30 per second and if the holding time is Y seconds, the data integration degree is value "1/(X*Y)".

Examples of the packets discussed in step S33 of the flowchart in FIG. 21 will be described below with reference to FIGS. 22A and 22B.

[Packets]

FIGS. 22A and 22B illustrate examples of packets generated by the data transfer program 120 in this embodiment.

FIG. 22A illustrates a first packet PK1 including one item of data, while FIG. 22B illustrates a second packet PK2 including two items of data.

The first packet PK1 illustrated in FIG. 22A has a header Hd, a command Cm, and data Dt. The header Hd is a TCP/IP header, for example, and includes the IP address of a transfer destination gateway 10. The command Cm is a Chord command indicating an instruction to perform data register processing.

The data Dt indicates the gateway ID of a register gateway 10 and register data. The gateway ID of the register gateway 10 is the node ID of a sending destination node. The register data (data) indicates the gateway ID of a gateway 10 that has received data transmitted from a beacon 30, beacon ID of this beacon 30, and time information, as discussed with reference to FIG. 14.

The second packet PK2 illustrated in FIG. 22B has a header Hd, a command Cm, and integrated data. The header Hd and the command Cm are similar to those of the first packet PK1. The integrated data includes plural items of data Dt-1 and Dt-2. Each of the items of data Dt-1 and Dt-2 is similar to the data Dt included in the first packet PK1.

The gateway 10 in this embodiment generates a packet PK2 including plural items of data. Thus, fewer packets are generated, and the number of session procedures and the number of data sending and receiving times are decreased, thereby reducing the network load.

FIG. 22B illustrates an example in which a packet includes two items of data Dt-1 and Dt-2. However, a packet may include three or more items of data. If communication is based on HTTP protocols, the header Hd also includes a HTTP header.

[Sending Processing from Gateway 10-0 to Gateway 10-15]

Figure 23:
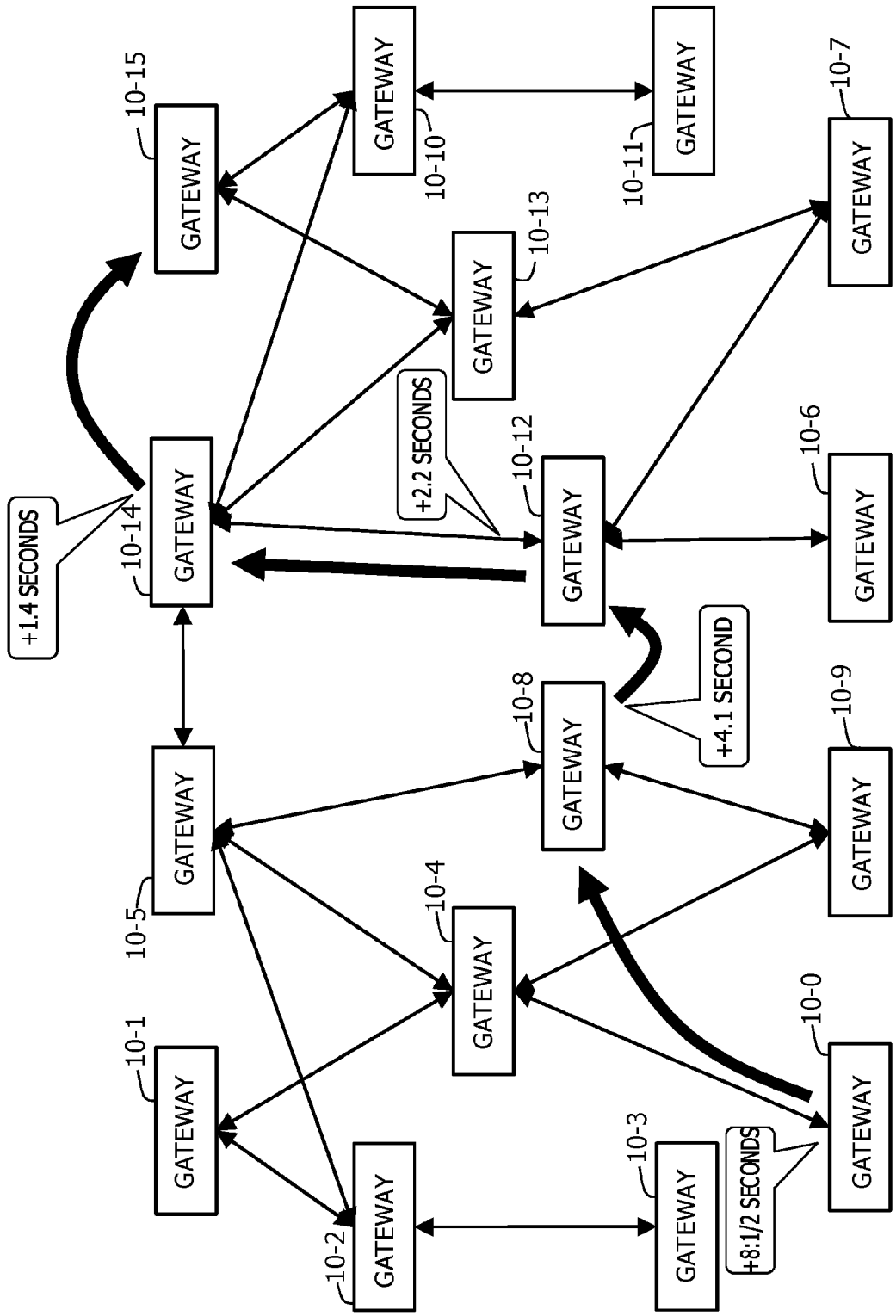
FIG. 23 illustrates sending processing from a gateway 10-0 to a gateway 10-15 illustrated in FIG. 2.

FIG. 23 illustrates sending processing from the gateway 10-0 to the gateway 10-15 illustrated in FIG. 2. In FIG. 23, the same elements as those illustrated in FIG. 2 are designated by like reference numerals.

As discussed with reference to FIGS. 13 and 19, the sending path from the gateway 10-0 to the gateway 10-15 is a path "gateway 10-0→gateway 10-8→gateway 10-12→gateway 10-14→gateway 10-15".

The holding time table 132 illustrated in FIG. 15 indicates that the gateway 10-0 integrates items of data accumulated for 1/2 seconds and transfers them to the gateway 10-8. The gateway 10-8 then integrates items of data accumulated for one second and transfers them to the gateway 10-12. The gateway 10-12 then integrates items of data accumulated for two seconds and transfers them to the gateway 10-14. The gateway 10-14 then integrates items of data accumulated for four seconds and transfers them to the gateway 10-15.

In this manner, by utilizing the characteristics of Chord, the gateway 10 in this embodiment sets a longer holding time for a transfer destination having a short distance from a transfer source and sets a shorter holding time for a transfer destination having a long distance from a transfer source. The gateway 10 is thus able to efficiently integrate data so as to reduce the network load and to sufficiently avoid an increase in the data sending time.

As discussed with reference to FIG. 3, transfer processing between gateways is performed based on the actual physical network. For example, transfer processing from the gateway 10-0 to the gateway 10-8 is implemented based on a path "gateway 10-0→gateway 10-4→gateway 10-5→gateway 10-8", for example.

[Integration of Data]

FIGS. 24A and 24B illustrate an example of data integration executed by the data transfer program 120 in this embodiment. FIG. 24A illustrates a case in which the holding time is two seconds regardless of the transfer destination. FIG. 24B illustrates a case in which the holding time is different according to the transfer destination. In FIGS. 24A and 24B, the vertical axis indicates the time (second), and the time elapses in the downward direction, while the horizontal axis indicates some of the nodes illustrated in FIG. 19, for example.

FIGS. 24A and 24B illustrate a case in which data is sent from each of sending source nodes ("6", "8", and "12") to a sending destination node ("15"). In the example in FIGS. 24A and 24B, node "6" receives data from the beacon 30a at time "0.5 seconds", and node "12" receives data from the beacon 30b at time "3 seconds". Then, node "8" receives data from the beacon 30a at time "4 seconds". The register gateway 10 of the beacons 30a and 30b is node "15".

[Uniform Holding Time]

In the example in FIG. 24A, each node transfers items of data accumulated for two seconds together. Node "6" transfers data to node "14" at time "2.5 seconds" after the lapse of two seconds upon receiving the data (x1). Node "14" transfers the data to node "15" at time "4.5 seconds" after the lapse of two seconds upon receiving the data from node "6" (x2).

Similarly, node "12" transfers data to node "14" at time "5 seconds" after the lapse of two seconds upon receiving the data (x3). Node "14" transfers the data to node "15" at time "7 seconds" (x4).

Node "8" transfers data to node "12" at time "6 seconds" after the lapse of two seconds upon receiving the data (x5). Node "12" transfers data to node "14" at time "8 seconds" (x6). Node "14" transfers data to node "15" at time "10 seconds" (x7).

In the example in FIG. 24A, no items of data are integrated. Thus, the number of packets is seven. Data sent from node "6" and data sent from node "12" reach node "15" after the lapse of four seconds. Data sent from node "8" reaches node "15" after the lapse of six seconds.

(Different Holding Times)

In the example in FIG. 24B, each node transfers data based on the holding time table 132 illustrated in FIG. 15. Node "6" transfers data to node "14" at time "1 second" after the lapse of 0.5 seconds upon receiving the data (y1).

Node "8" transfers data to node "12" at time "5 seconds" after the lapse of one second upon receiving the data (y2). After the lapse of two seconds upon receiving data at time "3 seconds", node "12" transfers this data and data transferred from node "8" together to node "14" at time "5 seconds" (y3).

At time "5 seconds" after the lapse of four seconds upon receiving data from node "6", node "14" transfers this data and data transferred from node "12" together to node "15" (y4).

In the example in FIG. 24B, when transferring data from node "12" to node "14", two items of data are integrated, and when transferring data from node "14" to node "15", three items of data are integrated. Thus, four packets are generated, in contrast to seven packets in the example in FIG. 24A. Based on data transfer processing in this embodiment, the data integration degree is enhanced.

In the example in FIG. 24B, data sent from node "6" reaches node "15" after the lapse of 4.5 seconds, data sent from node "12" reaches node "15" after the lapse of two seconds, and data sent from node "8" reaches node "15" after the lapse of one second. Although the data sending time from node "6" is longer than that in the example of FIG. 24A, the data sending time from node "8" and that from node "12" are significantly reduced.

Although the holding time before transferring data from node "14" to node "15" is long, node "14" is able to integrate items of data received during this holding time and transfer them together. The holding time for a long transfer path is short, thereby making it possible to significantly reduce the sending time for some items of data. In this manner, the gateway 10 in this embodiment determines the holding time according to the transfer destination, thereby making it possible to enhance the data integration efficiency and to sufficiently avoid an increase in the sending time.

[Other Embodiments]

The holding times (waiting times) for the individual transfer destinations are not restricted to those in the holding time table 132 illustrated in FIG. 15. The holding time may be determined based on the frequency of register processing and search processing, for example. In the holding time table 132 illustrated in FIG. 15, the holding times of all transfer destinations are different. However, the holding times of only some transfer destinations may be different.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of transferring data executed by a data transfer device, the method comprising:
   receiving a plurality of first data and a plurality of second data;
   determining that the received plurality of first data are to be sent to a first node as a transfer destination node, and that the received plurality of second data are to be sent to a second node as the transfer destination node;
   accumulating the received plurality of first data and the received plurality of second data respectively;
   sending, to the first node determined in the determining, the plurality of first data accumulated during a first period; and
   sending, to the second node determined in the determining, the plurality of second data accumulated during a second period, wherein
   the first period is longer than the second period when a first data amount of the plurality of first data to be sent to the first node per unit time is greater than a second data amount of the plurality of second data to be sent to the second node per the unit time.

2. The method according to claim 1, wherein
   in a node network including a plurality of nodes including a sending source node, a sending destination node, the transfer destination node, and the data transfer device, the plurality of first data are sent from the sending source node to the data transfer device and are sent from the data transfer device to the sending destination node via the first node as the transfer destination node.

3. The method according to claim 2, further comprising:
assigning position information indicating positions of each of the plurality of nodes aligned on an imaginary circumference;
determining the transfer destination node among the plurality of nodes having a smallest difference between the position indicated by the position information assigned to the transfer destination node and the position indicated by the position information assigned to the sending destination node in a first direction of the imaginary circumference; and
determining the first period based on a difference between the position indicated by the position information assigned to the data transfer device and the position indicated by the position information assigned to the first node as the transfer destination node in the first direction of the imaginary circumference.

4. The method according to claim 3, wherein
the determining of the first period includes determining the first period so as that the first period in a case that the difference is a first value is longer than the first period in a cases that the difference is a second value greater than the first value.

5. The method according to claim 1, wherein
the plurality of first data accumulated during the first period are sent as one or a plurality of packets.

6. A data transfer device comprising:
a memory; and
a processor coupled to the memory and configured to:
receive a plurality of first data and a plurality of second data,
execute a determining process which determines that the received plurality of first data are to be transferred to a first node as a transfer destination node, and that the received plurality of second data are to be sent to a second node as the transfer destination node,
accumulate the received plurality of first data and the received plurality of second data respectively,
send, to the first node determined in the determining process, the plurality of first data accumulated during a first period, and
send, to the second node determined in the determining process, the plurality of second data accumulated during a second period, wherein
the first period is longer than the second period when a first data amount of the plurality of first data to be sent to the first node per unit time is greater than a second data amount of the plurality of second data to be sent to the second node per the unit time.

7. The data transfer device according to claim 6, wherein
in a node network including a plurality of nodes including a sending source node, a sending destination node, the transfer destination node, and the data transfer device, the plurality of first data are sent from the sending source node to the data transfer device and are sent from the data transfer device to the sending destination node via the first node as the transfer destination node.

8. The data transfer device according to claim 7, wherein
the processor is further configured to:
assign position information indicating positions of each of the plurality of nodes aligned on an imaginary circumference,
determine the transfer destination node among the plurality of nodes having a smallest difference between the position indicated by the position information assigned to the transfer destination node and the position indicated by the position information assigned to the sending destination node in a first direction of the imaginary circumference, and
determine the first period based on a difference between the position indicated by the position information assigned to the data transfer device and the position indicated by the position information assigned to the first node as the transfer destination node in the first direction of the imaginary circumference.

9. The data transfer device according to claim 8, wherein
the first period is determined so as that the first period in a case that the difference is a first value is longer than the first period in a cases that the difference is a second value greater than the first value.

10. The data transfer device according to claim 6, wherein
the plurality of first data accumulated during the first period are sent as one or a plurality of packets.

11. A non-transitory computer-readable storage medium storing a program that causes an information processing apparatus to execute a process, the process comprising:
receiving a plurality of first data and a plurality of second data;
determining that the received plurality of first data are to be sent to a first node as a transfer destination node, and that the received plurality of second data are to be sent to a second node as the transfer destination node;
accumulating the received plurality of first data and the received plurality of second data respectively;
sending, to the first node determined in the determining, the plurality of first data accumulated during a first period; and
sending, to the second node determined in the determining, the plurality of second data accumulated during a second period, wherein
the first period is longer than the second period when a first data amount of the plurality of first data to be sent to the first node per unit time is greater than a second data amount of the plurality of second data to be sent to the second node per the unit time.

12. The non-transitory computer-readable storage medium according to claim 11, wherein
in a node network including a plurality of nodes including a sending source node, a sending destination node, the transfer destination node, and the information processing apparatus, the plurality of first data are sent from the sending source node to the information processing apparatus and are sent from the information processing apparatus to the sending destination node via the first node as the transfer destination node.

13. The non-transitory computer-readable storage medium according to claim 12, the process further comprising:
assigning position information indicating positions of each of the plurality of nodes aligned on an imaginary circumference;
determining the transfer destination node among the plurality of nodes having a smallest difference between the position indicated by the position information assigned to the transfer destination node and the position indicated by the position information assigned to the sending destination node in a first direction of the imaginary circumference; and
determining the first period based on a difference between the position indicated by the position information assigned to the information processing apparatus and the position indicated by the position information assigned to the first node as the transfer destination node in the first direction of the imaginary circumference.

14. The non-transitory computer-readable storage medium according to claim 13, wherein
the determining of the first period includes determining the first period so as that the first period in a case that the difference is a first value is longer than the first period in a cases that the difference is a second value greater than the first value.

15. The non-transitory computer-readable storage medium according to claim 11, wherein
the plurality of first data accumulated during the first period are sent as one or a plurality of packets.

* * * * *